United States Patent [19]
Pelly

[11] Patent Number: 6,038,155
[45] Date of Patent: Mar. 14, 2000

[54] THREE PHASE SCR RECTIFIER BRIDGE WITH SOFT START CONTROL IC

[75] Inventor: Brian R. Pelly, Palos Verdes Estates, Calif.

[73] Assignee: International Rectifier Corporation, El Segundo, Calif.

[21] Appl. No.: 09/302,777

[22] Filed: Apr. 30, 1999

Related U.S. Application Data

[63] Continuation-in-part of application No. 09/052,271, Mar. 31, 1998.
[60] Provisional application No. 60/083,950, May 1, 1998, and provisional application No. 60/107,110, Nov. 4, 1998.

[51] Int. Cl.[7] .................................................. H02M 7/155
[52] U.S. Cl. ............................ 363/129; 363/49; 363/125
[58] Field of Search ................................... 363/125, 126, 363/127, 49, 81, 84, 52, 129

[56] References Cited

U.S. PATENT DOCUMENTS 4,791,545   12/1988   Hinckley ....................................... 363/81

Primary Examiner—Adolf Deneke Berhane
Attorney, Agent, or Firm—Ostrolenk, Faber, Gerb & Soffen, LLP

[57] ABSTRACT

A soft start circuit for controlling a rectifier circuit, the rectifier circuit for converting power from an AC source having one or more phases to DC power having an output voltage (Vo) from a Vo+ node to a Vo− node, the rectifier circuit including: (i) at least first and second rectifier legs coupled from the Vo− node to the Vo+ node, each rectifier leg including a diode and a silicon controlled rectifier (SCR), wherein anodes of the diodes are coupled to the Vo− node, cathodes of the diodes are coupled to anodes of the SCRs at AC input nodes, and cathodes of the SCRs are coupled to the Vo+ node; and (ii) a bus capacitor coupled from the Vo+ node to the Vo− node, the soft start circuit operable to control respective firing angles of the SCRs such that: (i) the output voltage substantially linearly ramps from a low initial value to a relatively high final value, and (ii) charge up currents into the bus capacitor are controlled.

98 Claims, 17 Drawing Sheets

THREE PHASE SCR RECTIFIER BRIDGE WITH SOFT START CONTROL IC

RELATED APPLICATION

This application is based on and claims priority to: U.S. patent application Ser. No. 60/083,950, filed May 1, 1998; and Ser. No. 60/107,110, filed Nov. 4, 1998, both entitled THREE PHASE SCR RECTIFIER BRIDGE WITH SOFT START CONTROL IC, and the entire disclosures of which are hereby incorporated by reference.

This application is a continuation-in-part of U.S. patent application Ser. No. 09/052,271, filed Mar. 31, 1998, entitled SOFT START BRIDGE RECTIFIER CIRCUIT, the entire disclosure of which is hereby incorporated by reference.

BACKGROUND OF THE INVENTION

1. Field of the Invention

The present invention relates to a soft start control for an SCR and diode bridge and, more particularly, to a soft start circuit which provides phase control of the SCRs to limit in-rush current at start-up or during other periods.

2. Related Art

Conventional bridge rectifier circuits are not well equipped to handle high start-up currents and short circuits which stress circuit component such as fuses, bridge diodes and smoothing capacitors. Typically, for example, the occurrence of an output short circuit destroys a protection fuse between a power supply and the bridge rectifier, requiring replacement of the fuse. To limit the in-rush current at turn on, conventional circuits include a thermistor or a relay in series with the output of the rectifier bridge. Thermistor protection, although inexpensive, is suitable only for low power applications.

Relay protection, while more reliable and efficient than a thermistor, comes at a significant cost premium, typically 50% to more than 100% of the bridge rectifier cost, and occupies a significant amount of space, usually more than the bridge rectifier itself.

Therefore, a need exists for a self-contained bridge rectifier circuit which can be provided in a module or a package similar to that of a conventional bridge rectifier, but which also provides an in-rush current protection on start-up and short circuit protection during operation without a significant cost premium.

It is desirable to have a three-phase SCR rectifier bridge, with a Soft Start Integrated Circuit (IC) to provide phase-control of the SCRs to limit the charging current of a DC bus capacitor, regulate the DC output voltage in response to an input control voltage, and deliver status feedback signals.

SUMMARY OF THE INVENTION

In order to overcome the disadvantages of the prior art, the present invention provides a soft start circuit for controlling a rectifier circuit, the rectifier circuit for converting power from an AC source having one or more phases to DC power having an output voltage (Vo) from a Vo+ node to a Vo− node. The rectifier circuit includes: (i) at least first and second rectifier legs coupled from the Vo− node to the Vo+ node, each rectifier leg including a diode and a silicon controlled rectifier (SCR). Anodes of the diodes are coupled to the Vo− node, cathodes of the diodes are coupled to anodes of the SCRs at AC input nodes, and cathodes of the SCRs are coupled to the Vo+ node.

The rectifier circuit also includes a bus capacitor coupled from the Vo+ node to the Vo− node. One or more inductors may be included between the Vo+ and/or Vo− nodes which couple the capacitor thereto.

The soft start circuit controls respective firing angles of the SCRs such that: (i) the output voltage substantially linearly ramps from a low initial value to a relatively high final value, and (ii) charge up currents into the bus capacitor are controlled.

The soft start circuit may include an integrator circuit operable to produce timing waves corresponding to integrals of respective positive half cycles of the one or more phases of the AC source, the timing waves resetting when the one or more phases of the AC source are concurrently negative.

The soft start circuit may include a peak storage circuit operable to produce a peak voltage, VPK, corresponding to peaks of the timing waves; and a ramp circuit operable to produce a timing reference signal capable of ramping from an initial value substantially equal to VPK to a final value lower than the initial value.

The soft start circuit may include a comparator circuit operable to produce pulsed output signals which initiate when the respective timing waves substantially equal the timing reference signal, the pulsed output signals for controlling respective firing angles of the SCRs.

The soft start circuit may include a watchdog circuit operable to reset respective timing waves when those waves do not reset within a specified (defined) period of time.

Preferably the soft start circuit also includes a first clamp circuit operable to hold the peak voltage VPK to substantially its initial value when the output voltage falls below a threshold.

Another clamp circuit is preferably operable to control the timing reference as a function of the output voltage when the output voltage falls below a threshold.

The soft start circuit may also include a loss of AC source circuit operable to produce an AC source loss signal indicative of whether the AC source is producing voltage, the AC source loss circuit being operable to cause the clamp circuit to release the timing reference when the AC source loss signal indicates that the AC source is producing voltage.

Preferably, the soft start circuit includes an output voltage regulation circuit including a error amplifier operable to receive an output voltage reference and a feedback signal representing the output voltage Vo, the error amplifier producing an error voltage having a magnitude proportional to the difference between the output voltage reference and the feedback signal; a ramp circuit operable to produce a timing ramp signal capable of ramping from an initial value to a final value; a control circuit operable to produce a timing reference signal having a magnitude which is a function of at least one of the error signal and the timing ramp signal; a comparator circuit operable to produce pulsed output signals for controlling respective firing angles of the SCRs, the pulsed output signals being initiated as a function of the magnitude of the timing reference signal; and an error voltage enabling circuit operable to (i) reduce the magnitude of the error voltage available to the control circuit when the error voltage is a predetermined polarity, and (ii) not change the magnitude of the error voltage available to the control circuit when the error voltage is of an opposite polarity.

Preferably, the control circuit is operable to produce the timing reference signal such that its magnitude substantially represents the sum of VPK and the error voltage minus the timing ramp signal.

It is also preferred that the error amplifier produces the error voltage such that it has a first polarity when the magnitude of the output voltage reference is greater than the magnitude of the feedback signal and a second polarity when the magnitude of the output voltage reference is less than the magnitude of the feedback signal, and the error voltage enabling circuit (i) reduces the magnitude of the error voltage available to the control circuit when the error voltage is of the first polarity, and (ii) does not substantially change the magnitude of the error voltage available to the control circuit when the error voltage is of the second polarity.

Other objectives, features and advantages of the present invention will become apparent to those skilled in the art from the following description of the invention which refers to the accompanying drawing.

DETAILED DESCRIPTION OF THE PREFERRED EMBODIMENT

Figure 1:
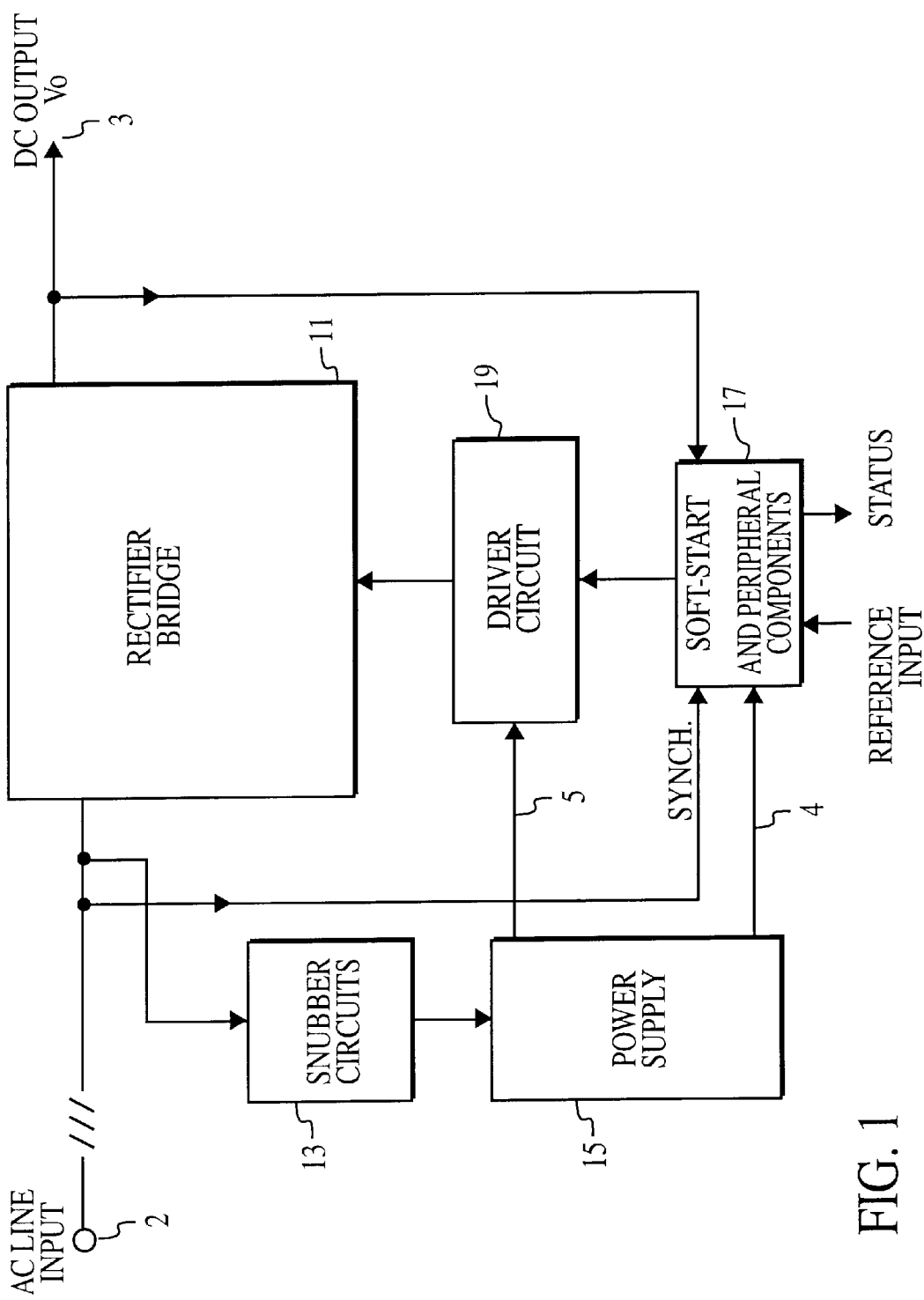
FIG. 1 is a block diagram of an embodiment of the present invention including an overall topology suitable for use with the invention.

FIG. 1 is a block diagram illustrating an embodiment of the present invention including an overall topology suitable for use with the invention. The invention includes a soft start circuit 17, preferably an application specific integrated circuit (ASIC), which provides control signals to a rectifier bridge 11 through an SCR driver circuit 19. The rectifier bridge receives input power from an AC source 2, preferably a three phase source, and produces rectified DC power at its output (Vo) 3. The topology also includes snubber circuits 13 and a snubber derived power supply 15.

The rectifier bridge 11 includes switchable power devices, preferably SCRs, which are controlled by the soft start circuit 17 through driver circuit 19. Controlling the SCRs provides both in-rush current limiting and regulation of the rectified DC output voltage, Vo.

Snubber circuits 13 prevent unwanted dv/dt firing of the SCRs (or other switchable power devices) in the rectifier bridge 11. The snubber derived power supply 15 receives energy from the snubber circuits 13 and produces DC power (or control power) on lines 4 and 5 to drive the soft start circuit 17 and driver circuit 19, respectively. Preferably, line 4 represents two sources of DC power, +/−5 VDC and the voltage on line 5 is about 15 VDC.

As will be discussed in more detail below, the soft start circuit 17 includes inputs for receiving signals from various portions of the topology, such as a SYNCH signal providing information for synchronizing to the AC source 2, and FEEDBACK and REFERENCE signals providing information for regulating the DC output voltage, Vo. The soft start circuit 17 also includes outputs (such as a STATUS signal) for providing information to other circuits concerning the operation of the rectifier.

Figure 2:
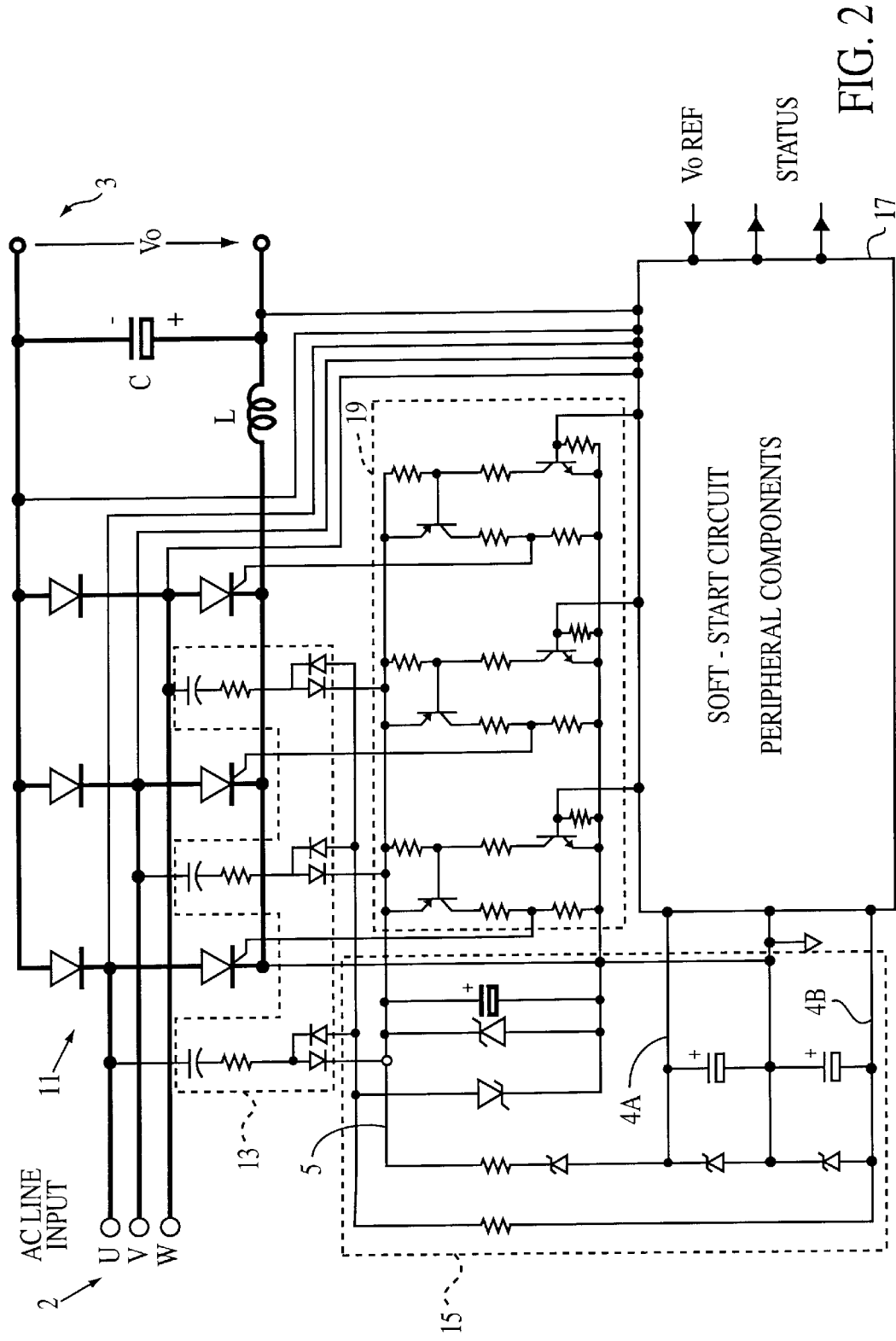
FIG. 2 is a partial schematic diagram and partial block diagram illustrating additional details of the rectifier topology of FIG. 1.
Figure 3A:
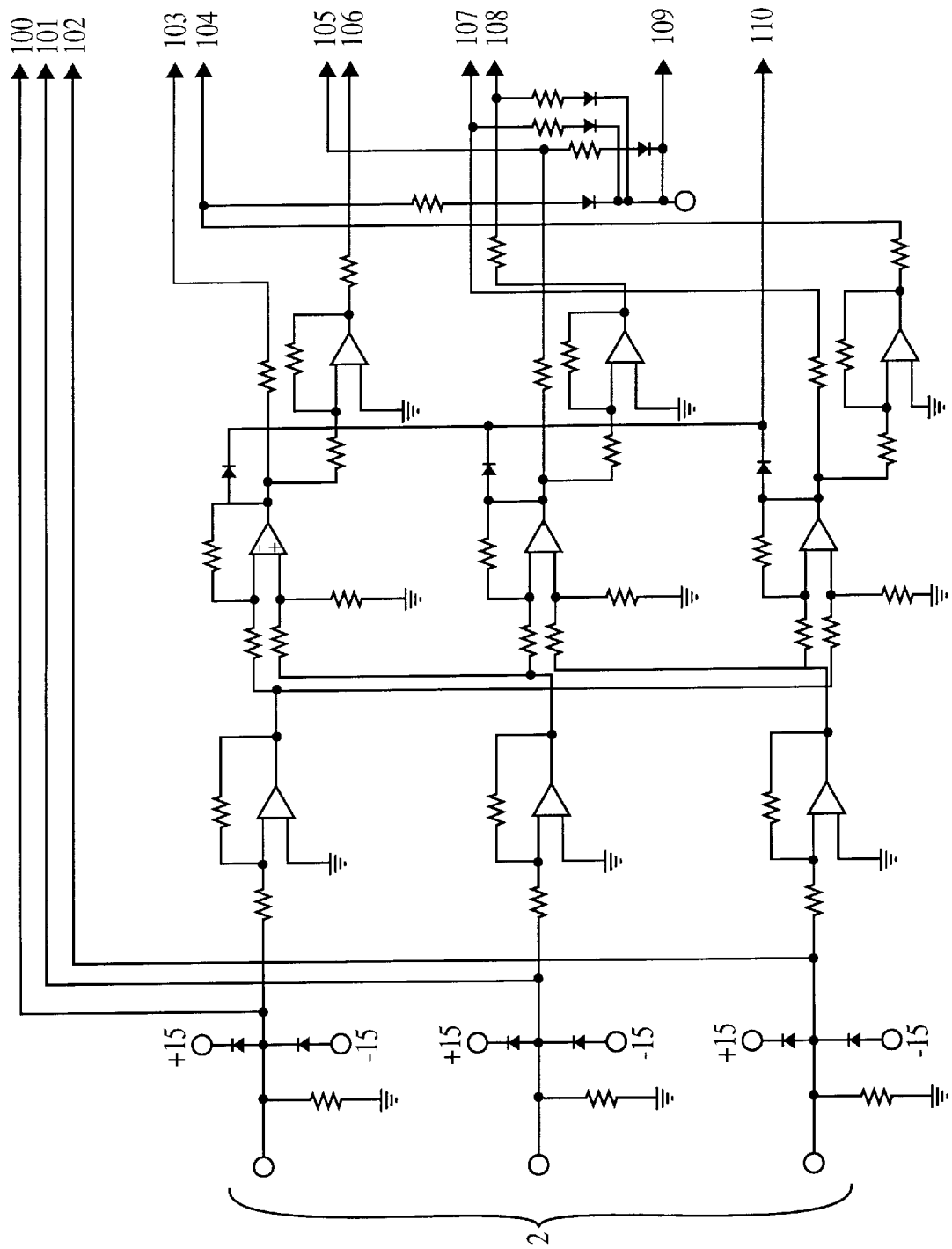
FIGS. 3a–3g are schematic diagrams illustrating the soft start circuit of the present invention implemented with discrete circuit components.
Figure 3B:
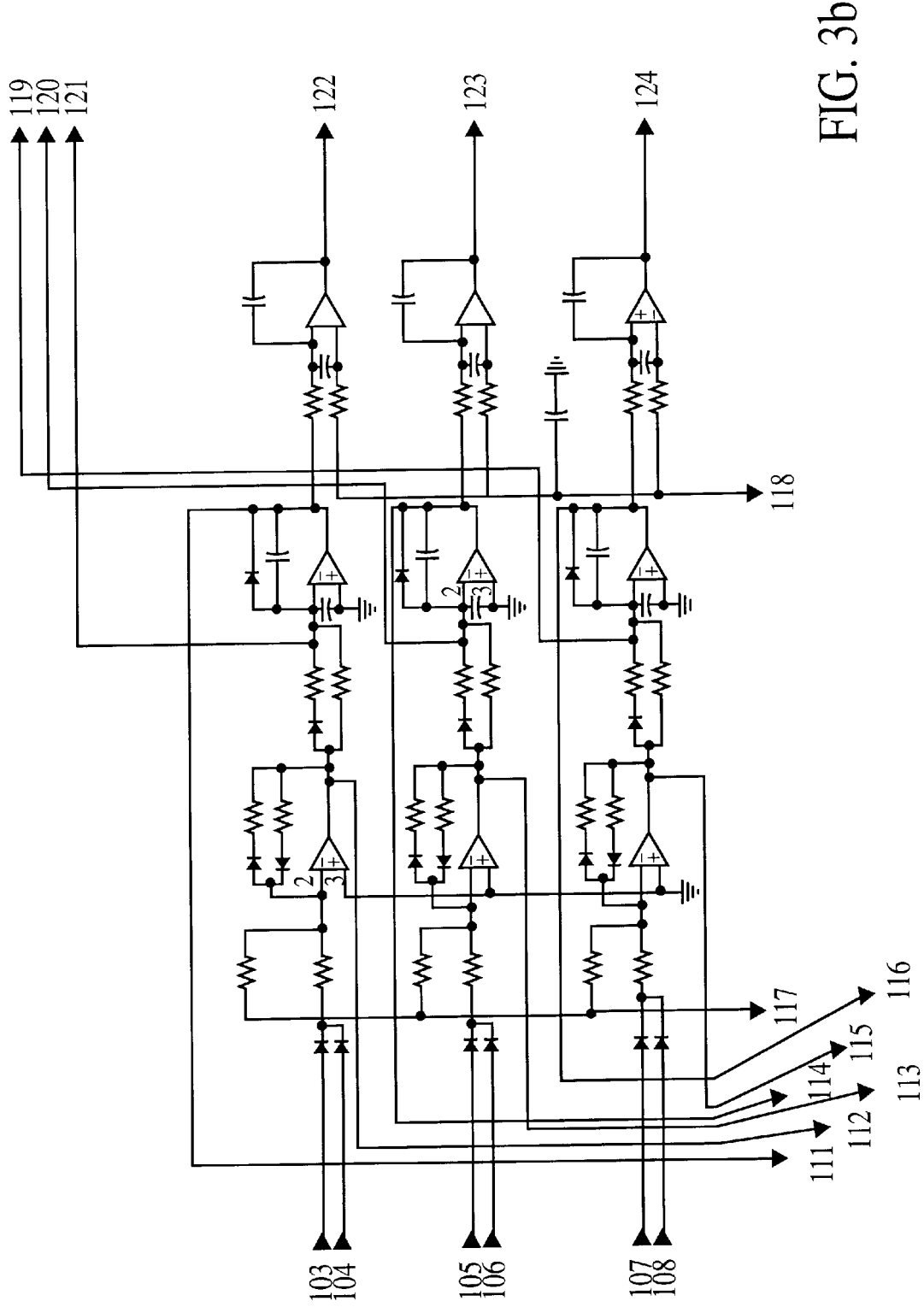
Figure 3C:
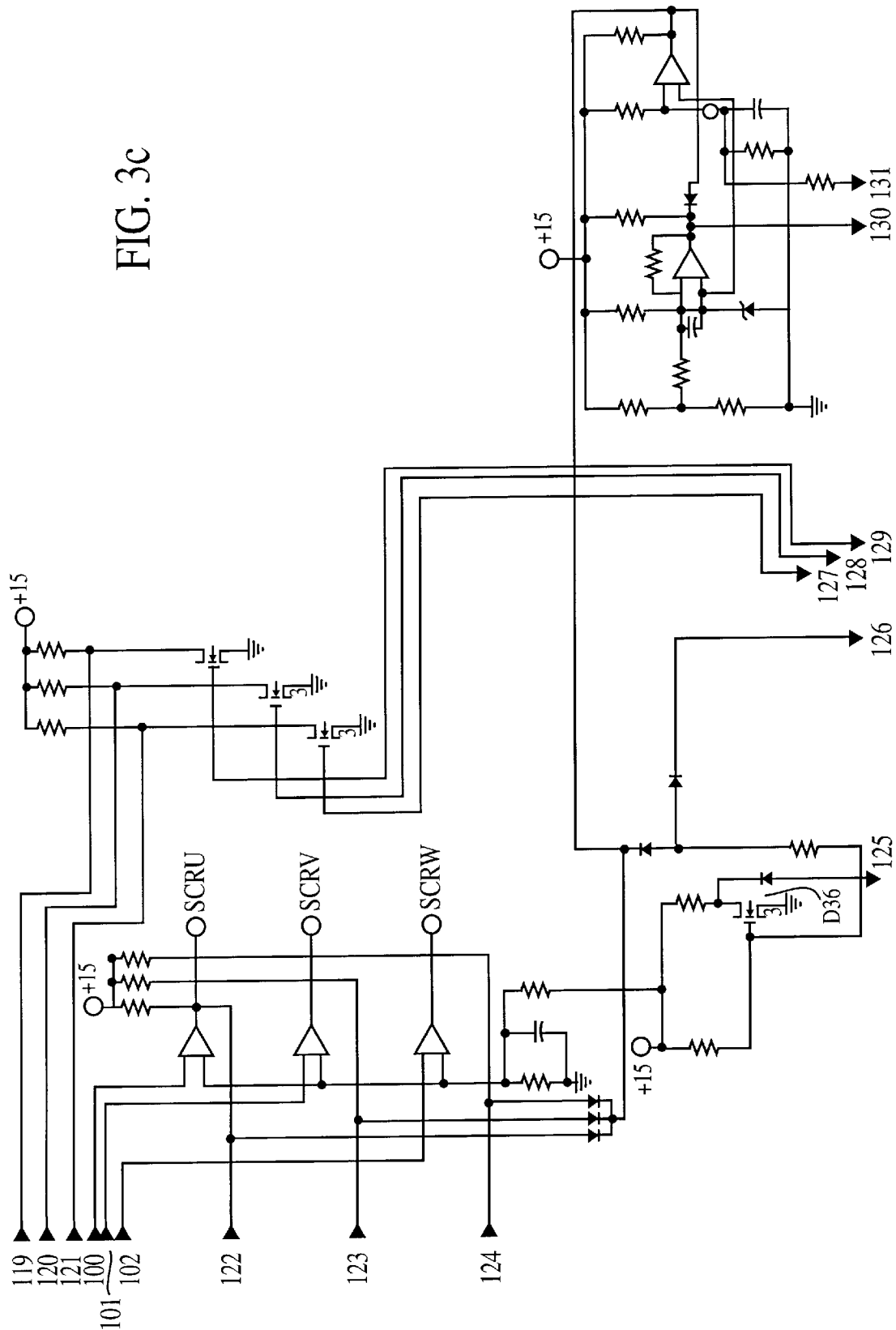
Figure 3D:
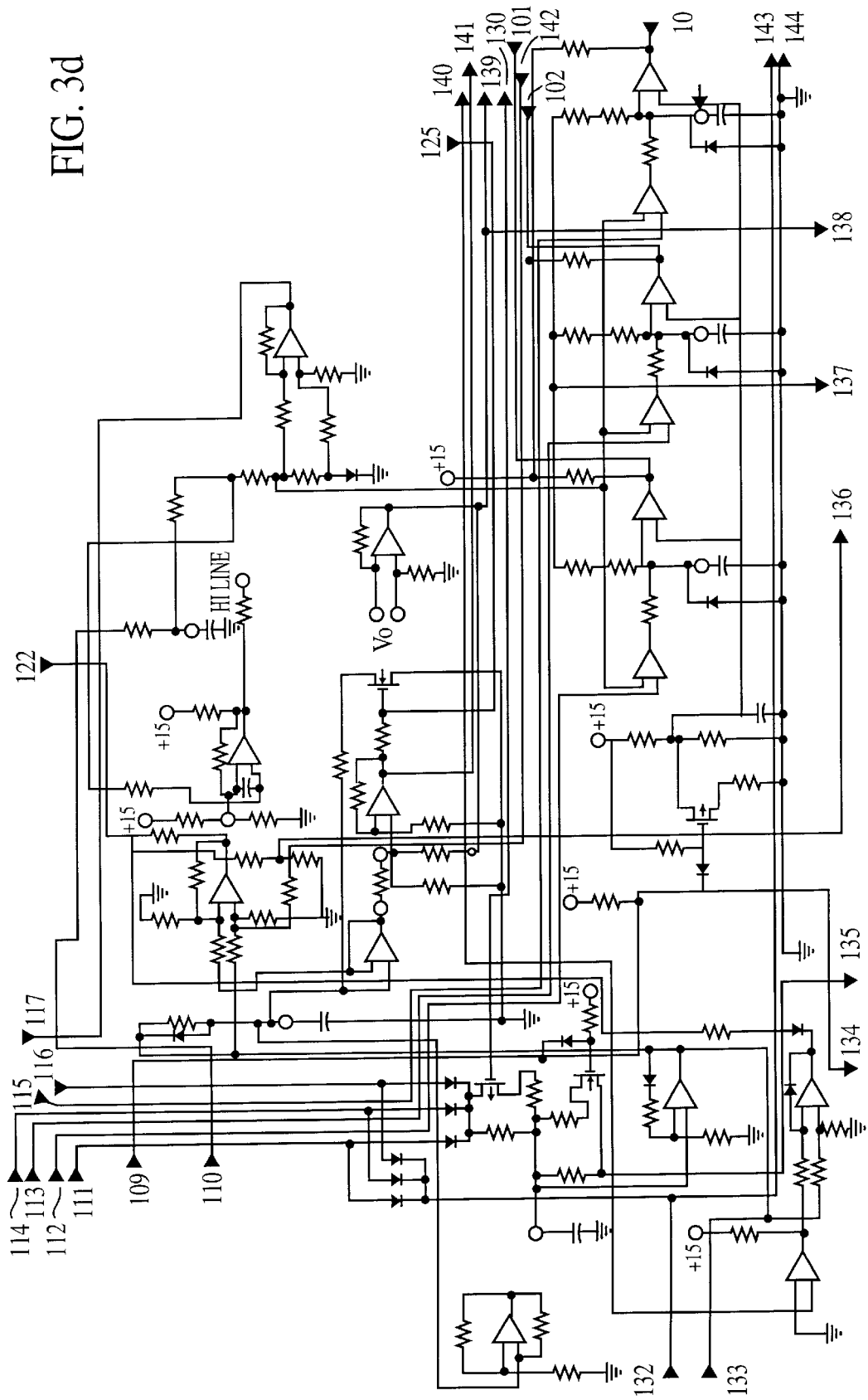
Figure 3E:
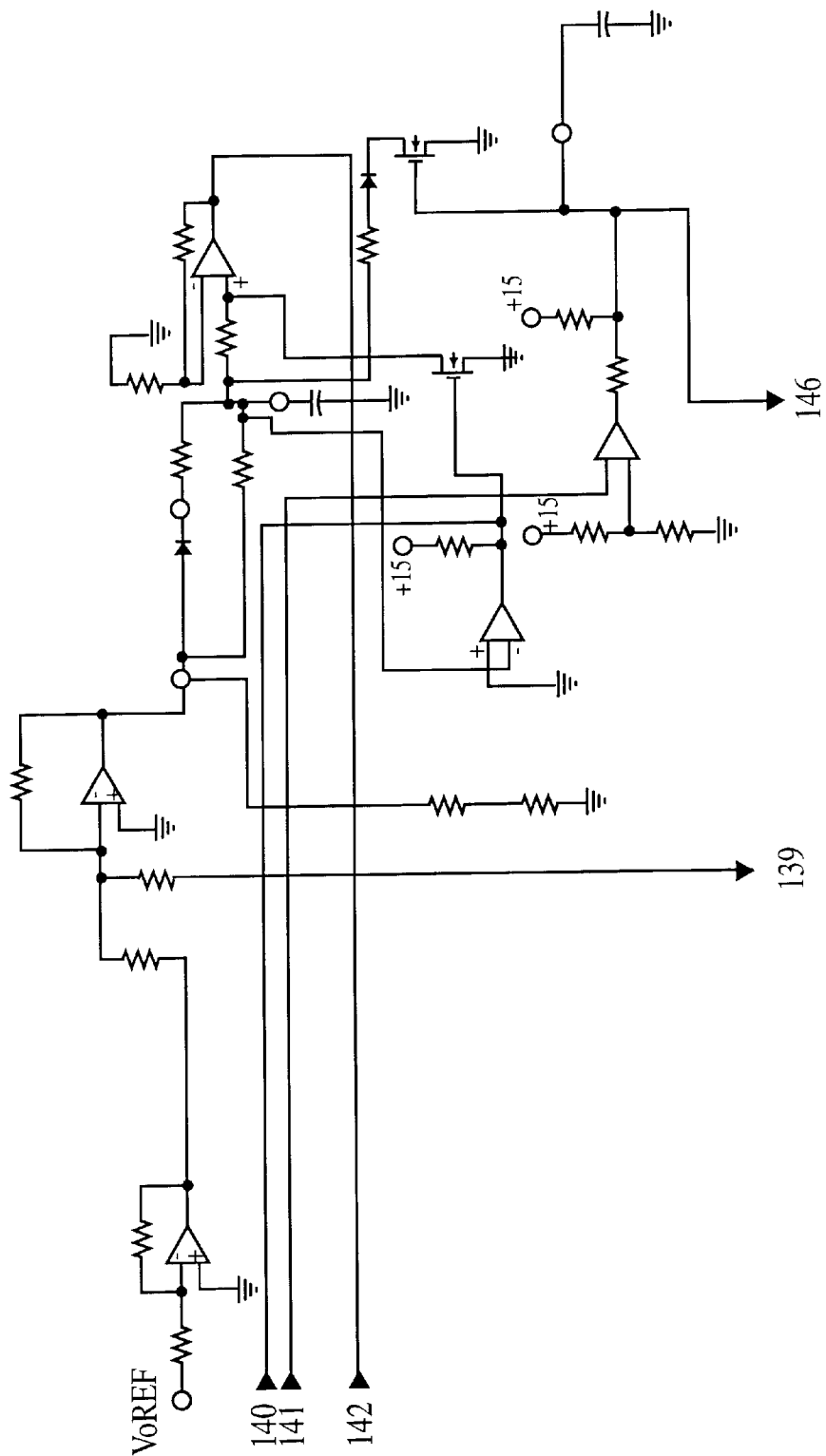
Figure 3F:
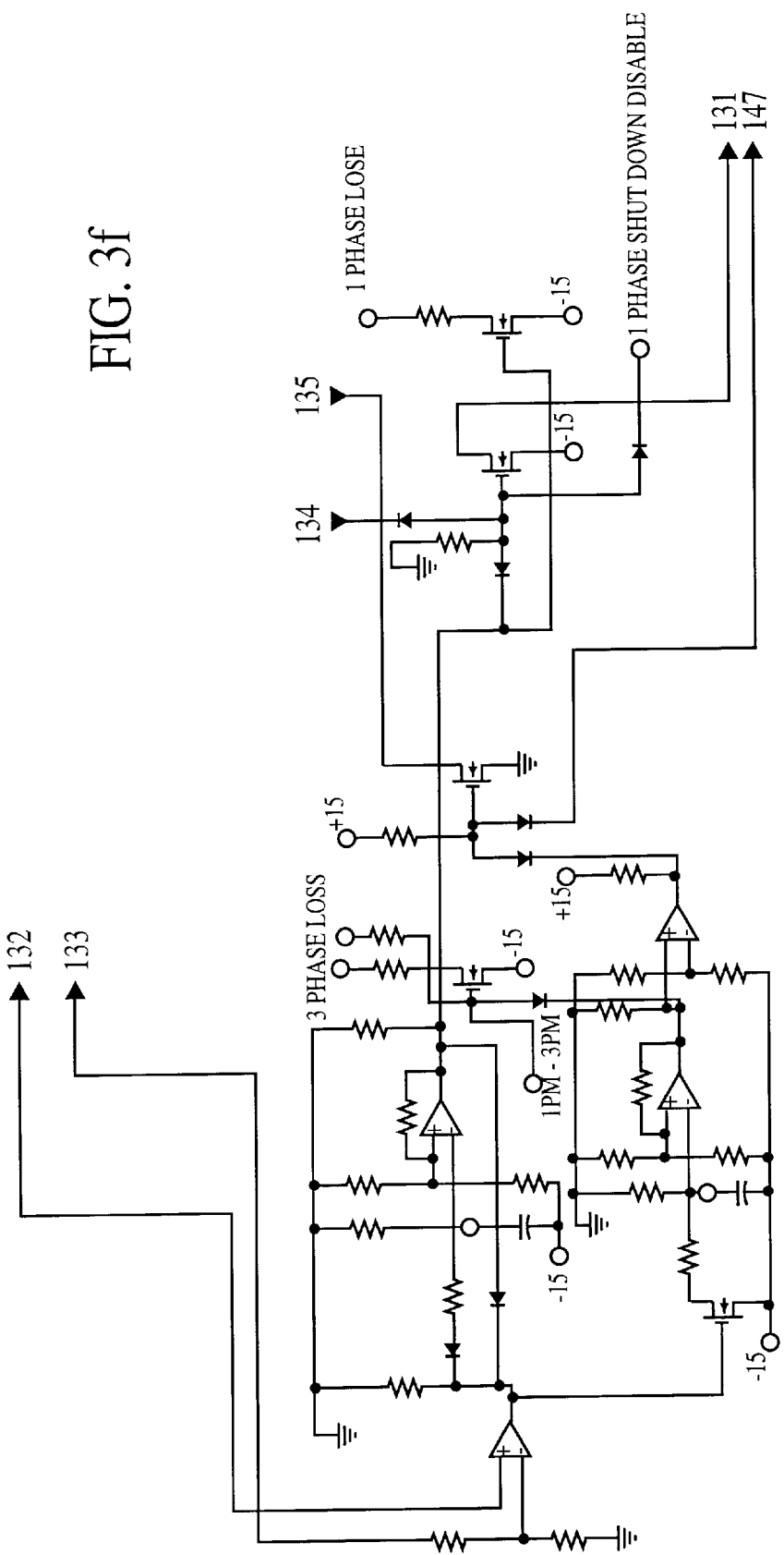
Figure 3G:
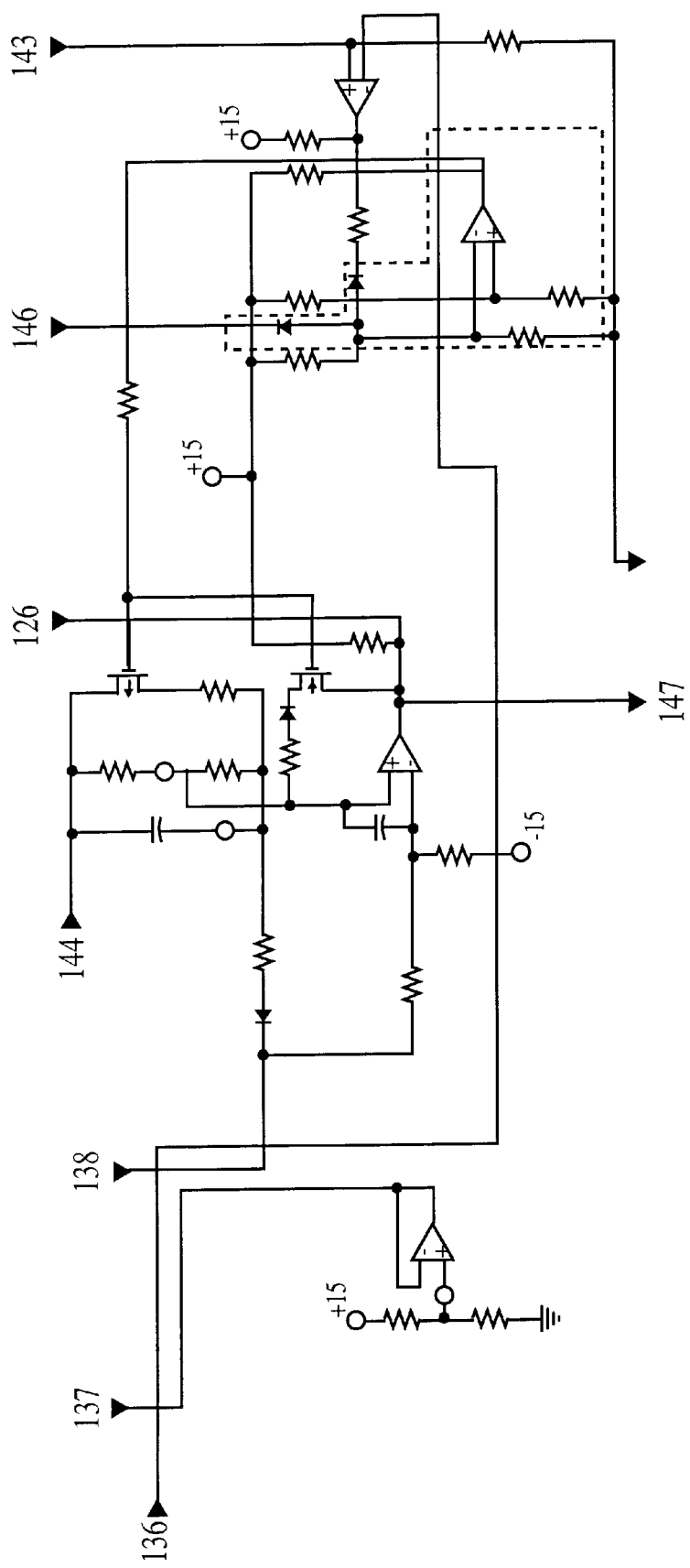

Reference is now made to FIG. 2 which is a partial schematic diagram and partial block diagram illustrating additional details of the rectifier topology of FIG. 1. The soft start circuit 17 is shown in block diagram form and is preferably implemented using a 64 pin MQFP ASIC. Those skilled in the art will understand from the teaching herein that additional external circuits may be required outside the ASIC to ensure good performance of the rectifier circuit.

Rectifier Bridge 11

Rectifier bridge 11 is shown coupled to a three phase AC source 2, where the three phases are labeled U, V, and W. The DC output voltage 3 is taken across a relatively large value bus capacitor C in the polarity shown. A low pass filter may be formed with bus capacitor C, for example, using inductor L. The rectifier bridge preferably includes three series coupled SCR-diode pairs (or legs) connected across bus capacitor C.

The rectifier bridge 11 with SCRs provides an AC to DC rectification function and regulation of the DC output voltage, Vo, by controlling the firing angle (or phase control) of the SCRs. Advantageously, phase control of the SCRs permits control of charging current (or in-rush current) for bus capacitor C. If not controlled, in-rush currents may be problematic whenever an imbalance exists between the DC voltage (Vo) 3 on bus capacitor C and the voltage of the AC source 2. An imbalance will generally occur whenever the voltage of the AC source 2 is switched on, after a line voltage dip or outage, or when the DC output 3 is overloaded.

Phase control of the SCRs also permits the DC output voltage 3 to be regulated to a predetermined level, and to be dynamically controlled during normal operation.

SCR Driver Circuit 19

The SCR gate driver circuit 19 amplifies control signals (gating signals, or timing pulses) received from the soft start circuit 17 and applies them to the SCR gates. The transistor networks shown provide an example of a suitable topology for implementing the SCR driver circuit 19.

Snubber Circuits 13

Snubber circuits 13 include a series coupled resistor and capacitor network connected to the anode of each SCR. Other snubber topologies may be employed without departing from the scope of the invention. The snubber circuits 13 prevent unwanted firing of the SCRs due to excessive dv/dt conditions within the rectifier circuit 11. Excessive dv/dt conditions often occur when the AC source 2 is switched on, or when the AC source line voltage(s) reappear after an outage.

Respective diode pairs couple each of the snubber circuits 13 to the power supply 15.

Power Supply 15

With reference to FIG. 2, the current through each of the RC snubber networks is channeled via a pair of rectifiers (diodes) to create DC power supply voltages (control power) for the soft start circuit 17 and SCR driver circuit 19.

Preferably, a positive output terminal of the rectifier circuit 11 (i.e., the node to which each SCR cathode is connected) is defined as the ground potential (or ground rail) for the soft start circuit 17 and SCR driver circuit 19. Positive snubber current flows from each RC snubber network through one diode of each pair and negative snubber current flows from each RC snubber network through the other diode of each pair. The positive and negative snubber currents are coupled to respective zener diode and capacitor networks to create DC control power.

Preferably, zener diodes are selected such that the power supply 15 produces: (i) a nominal 15V supply for the SCR driver circuit 19; (ii) a nominal positive 5 VDC supply for the Vdd input to the soft start circuit 17; and a nominal negative 5 VDC supply for the Vss input to the soft start circuit 17.

The zener diodes (in combination with respective resistors) also ensure that the voltages at the Vdd and Vss inputs to the soft start circuit 17 are protected against voltage transients that occur at the AC source 2. Advantageously, derivation of the control power via the SCR snubber circuits 13 eliminates the need for an additional AC line-derived power supply to service the soft start circuit 17 and/or other circuits.

It is noted that an auxiliary winding on a DC switching power supply fed by the DC output Vo (for example, a winding that is used to serve other system control functions) would not by itself serve the purpose of providing control power to the soft start circuit 17. This is because such a power supply cannot deliver voltage until after charging of the bus capacitor C has commenced. The soft start circuit 17, however, must be powered before charging of bus capacitor C begins.

Those skilled in the art will understand from the teaching herein that it is possible to use an auxiliary winding on a DC switching power supply to supplement the snubber-derived power supply. This may be preferred where the AC source inductance is high. In this case only minimal snubbers (unable to furnish the total power required for control power) are needed for dv/dt protection of the SCRs.

Soft Start Circuit 17 and Peripheral Components

Preferably, the soft start circuit 17 is implemented in ASIC form and peripheral discrete components and circuits provide functions that are not conveniently included within the ASIC.

Detailed Circuit Implementation

Referring to FIGS. 3a–3g, a schematic diagram showing the soft start circuit 17 implemented in discrete components is shown. Those skilled in the art will appreciate that modifications to the circuits shown in FIGS. 3a–3g may be required in producing an ASIC version of the soft start circuit 17. Indeed, many variations in the arrangement of circuit components are possible without departing from the scope of the invention.

Figure 4A:
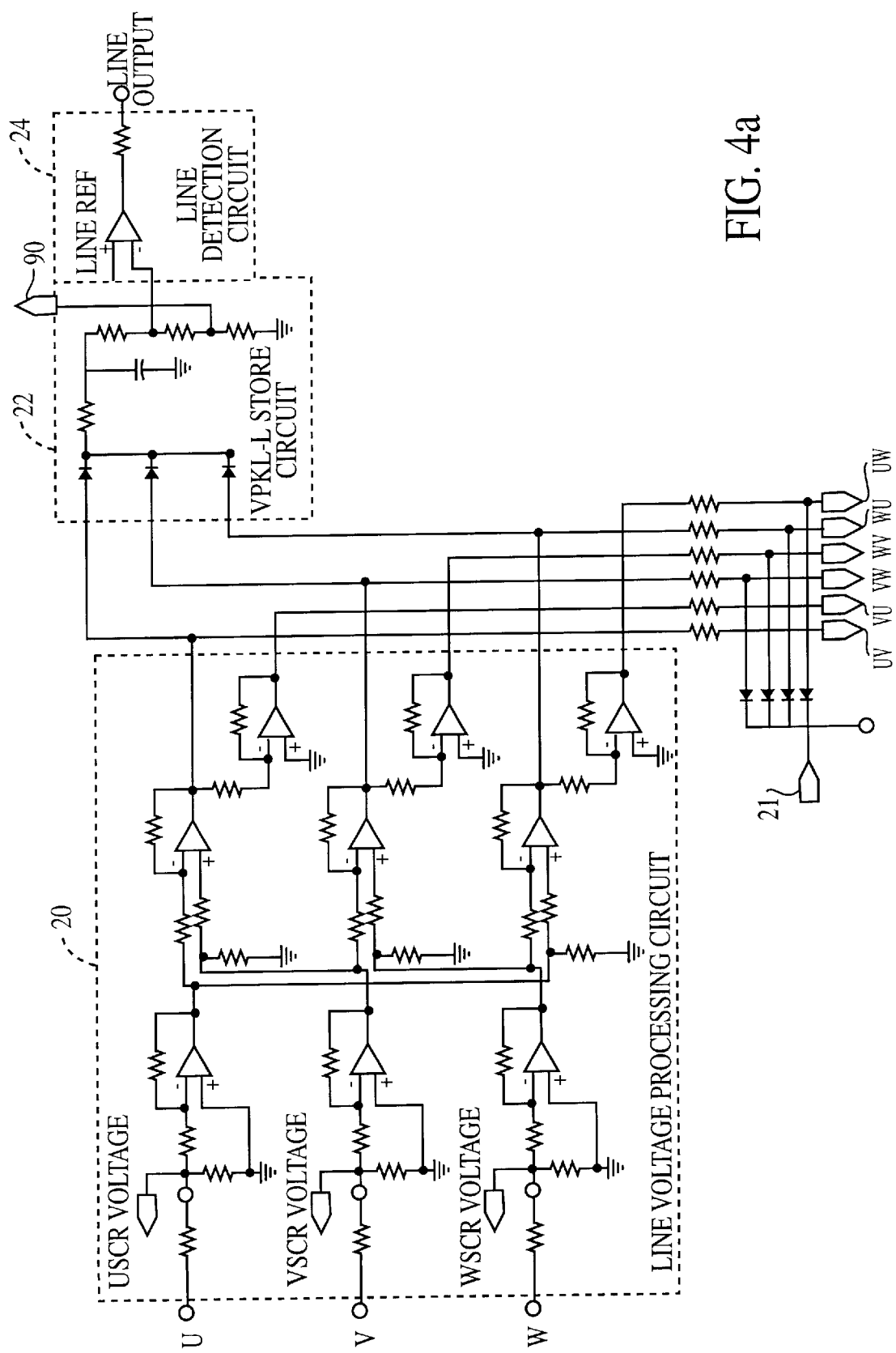
FIGS. 4a–4c are simplified schematic diagrams of the circuits of FIGS. 3a–3g.
Figure 4B:
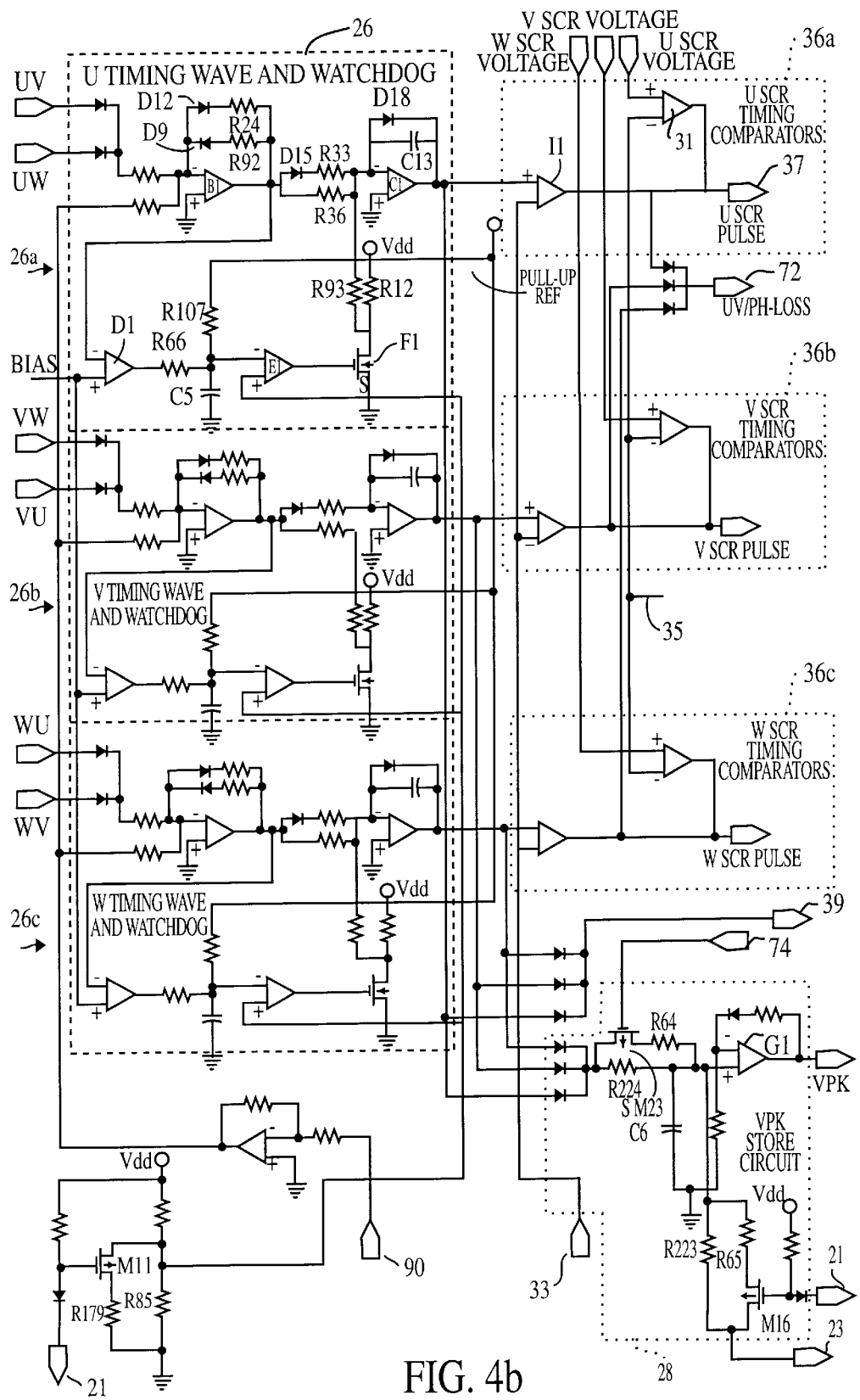
Figure 4C:
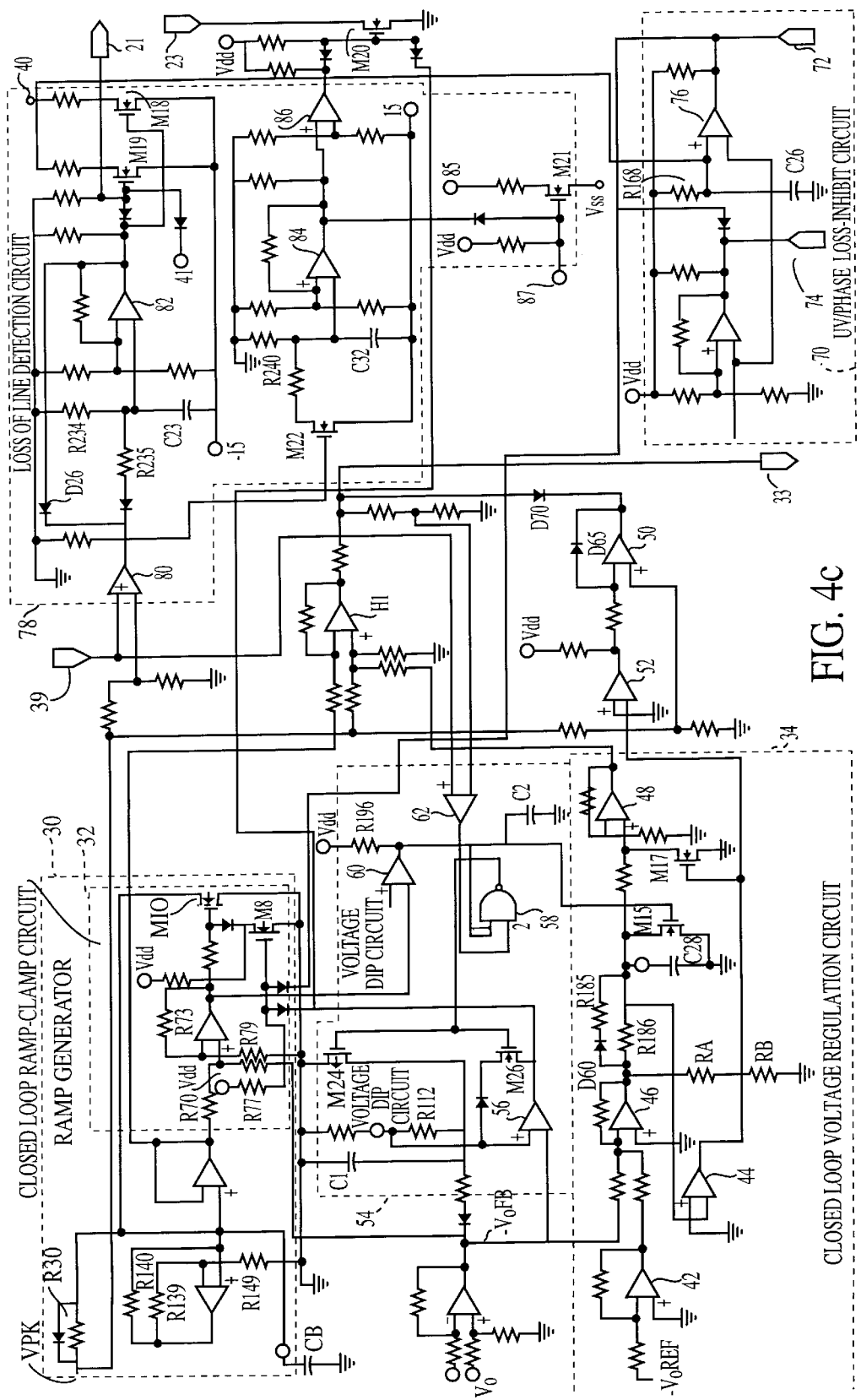

For simplicity, reference is made to the simplified circuit diagrams shown in FIGS. 4a, 4b, and 4c when discussing the operation of the soft start circuit 17 of the present invention.

Line Voltage Processing Circuit 20

Referring to FIG. 4a, the soft start circuit 17 includes a line voltage processing circuit 20. The function of the line voltage processing circuit 20 is to construct scaled replicas of the line-to-line voltages of the AC source 2, namely, (U-V), denoted UV'; (V-U), denoted VU'; (V-W), denoted VW'; (W-V), denoted WV';

(W-U), denoted WU'; and (U-W), denoted UW'.

The line-to-line voltages are preferably taken with the individual SCR voltages and input to respective inverting operational amplifiers. Outputs from the inverting operational amplifiers are coupled to respective differencing operational amplifiers (which produce the U-V difference, the V-W difference, and the W-U difference).

Outputs from the differencing operational amplifiers are coupled to respective inverting operational amplifiers (which produce the V-U difference, the W-V difference, and the U-W difference).

Figure 5A:
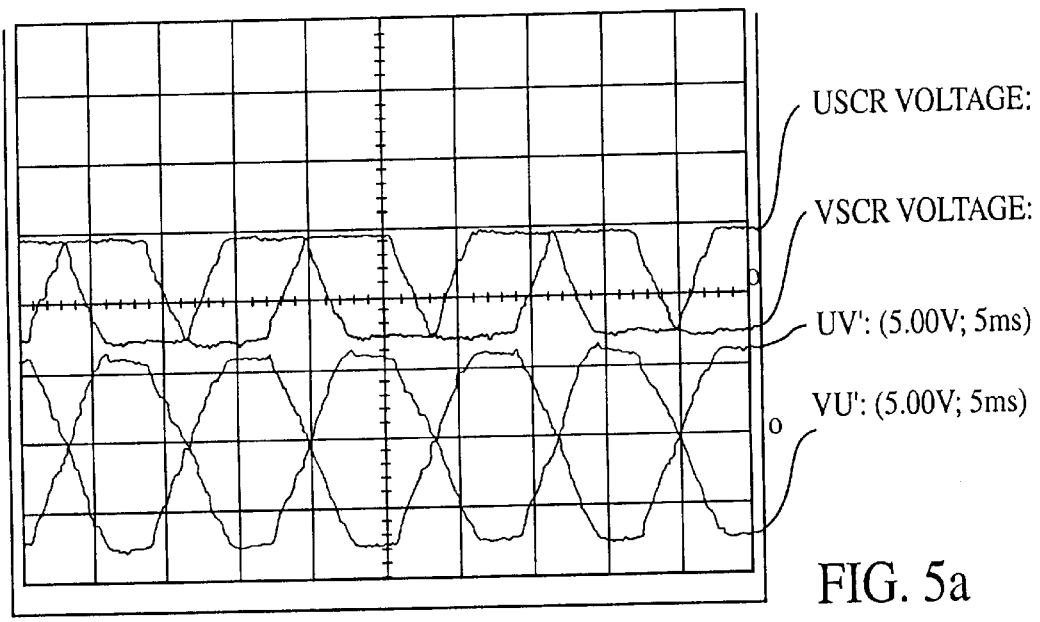
FIGS. 5a–5h comprise waveforms that depict the operation of the soft start rectifier.

FIG. 5a is a graph showing U and V SCR voltages and UV' and VU' voltages, the other phase waveforms (not shown) are similar but phase offset. Negative half-cycles of UV' and VU' have higher amplitudes than positive half-cycles because loading occurs during positive half-cycles. This loading is caused by the impedance of other circuits. Note that the ground potential of the circuit is the common point of the SCR cathodes (FIG. 2).

When the soft start circuit is used with a one phase AC source 2, the dedicated 1-phase line (line 21) is connected to the Vss terminal (i.e., 5 VDC). The effect of this is discussed hereinbelow under the heading Dedicated One Phase Operation.

VPKL-L Store Circuit

The soft start circuit 17 includes a VPKL-L circuit 22 which produces a value representing the peak line to line voltage of the AC source 2. Voltages U-V, V-W and W-V are rectified by three diodes. A scaled version of the peak line-to-line voltage, VPKL-L, of the AC source 2 is stored on a storage capacitor (the series resistor filters line voltage spikes)

Line Detection Circuit

The soft start circuit 17 also includes a line detection circuit 24 which receives the peak line-to-line voltage, VPKL-L, as input to a resistor divider network. A line detection comparator receives a line reference voltage, LINE REF, at its positive input terminal and a scaled version of the peak line-to-line voltage, VPKL-L, at its negative terminal.

The LINE OUTPUT of the line detection comparator goes low if VPKL-L exceeds the LINE REF value. Thus, for example, an opto-coupler can be connected to the LINE OUTPUT terminal to provide an isolated line feedback signal that indicates that the line voltage is above or below a designated level. This level may be set such that an indication of an abnormally high or low line voltage is provided.

Timing Wave and Watchdog Circuits

The soft start circuit 17 also includes a timing wave and watchdog circuit 26 (FIG. 4b), comprising a U timing wave and watchdog circuit 26a, a V timing wave and watchdog circuit 26b, and a W timing wave and watchdog circuit 26c.

The functions of the timing wave and watchdog circuits 26a, 26b, and 26c are to generate timing waves and provide watchdog capabilities. It is preferred that a set of three phase sawtooth timing waves are produced which have a certain phase relationship to the line-to-line voltages of the AC source 2. For example, it is preferred that the sawtooth timing waves are line-synchronized and balanced so that an intersection of these timing waves with a timing wave reference voltage defines desired firing instants for the SCRs.

Under abnormal operation of the rectifier circuit, such as temporary loss of all three line voltages of the AC source 2 (or loss of any one line voltage), the timing wave and watchdog circuits 26a, 26b, and 26c keep the sawtooth timing waves controlled to avoid mis-timed SCR firing pulses. This prevents large jumps of the DC output voltage, Vo, and excessive charging current in the bus capacitor C.

Timing Wave Function

The U, V, and W timing wave and watchdog circuits 26a, 26b, and 26c are preferably substantially identical. For simplicity, the following description refers to the U timing wave and watchdog circuit 26a only.

The UV' and UW' waveforms are rectified (via a pair of diodes) and input to an inverting operational amplifier 21. This is also known as diode "or-ing." Thus, when UV' is more positive than UW', amplifier E1 receives UV' as input. Similarly, when UW' is more positive than UV', amplifier BE receives UW' as input. When UV' and UW' are both negative, amplifier B1 receives substantially zero input.

A relatively small negative DC bias (small in relation to UV' and UW') is derived from, and is preferably proportional to, VPKL-L (see line 90, FIGS. 4a and 4b). This DC bias is also input to amplifier B1. Thus, the output of the inverting operational amplifier B1 is about equal to the difference of the DC bias and the rectified UV' and UW' waveforms.

For three-phase operation, the output of amplifier B1 is negative for the "active" period (almost 240 electrical degrees), and positive for the remaining "dwell" period (about 120 electrical degrees).

Figure 5B:
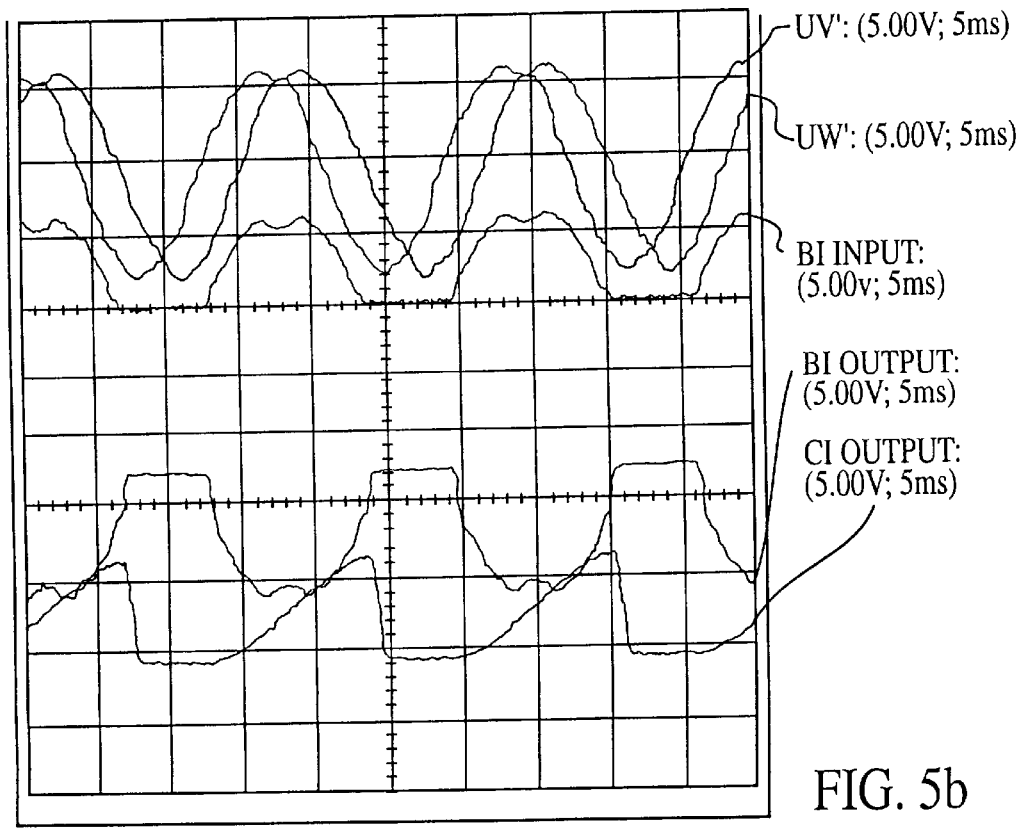

FIG. 5b is a graph showing the UV', UW' waveforms, the input of the B1 amplifier, and the output of the B1 amplifier.

Preferably, the value of feedback resistor R92 in series with D9 is about four times the value of the anti-parallel resistor R24 in series with D12. Thus, the gain of amplifier B1 is preferably about four times higher for positive output than for negative output. The positive output voltage of amplifier B1 during the dwell period is boosted relative to the negative output voltage during the active period.

The output of the inverting operational amplifier B1 is input to an integrating operational amplifier C1. During a negative portion of the signal at the output of amplifier B1, a negative flowing current equal to the output voltage of amplifier B1 divided by R36 is drawn through R36 and an integrator capacitor C13. This charges C13 in a positive sense.

During a positive portion of the signal at the output of amplifier B1, D15 is forward biased and positive flowing current (proportional to the inverse of the parallel combination of R33 and R36) is drawn through C13. This discharges (or resets) the integrating capacitor, C13. R33 is preferably much smaller than R36, thus the discharge rate of C13 is much faster than the charge rate, and C13 becomes fully discharged within about 1 ms.

The output of the integrating amplifier C1 is clamped at about −0.6 V, by the clamping diode D18.

The output of the integrating amplifier C1 is a pseudo sawtooth wave, going positive just after the UV' waveform crosses zero in a positive-going direction, and starts to reset just before the UW' voltage crosses zero in a negative-going direction. (For negative phase rotation of the AC input line 2, the relative timing of the UV' and UW' waveforms is reversed).

FIG. 5b shows the output waveform of amplifier C1 with respect to the UV', UW' waveforms, the input of the B2 amplifier, and the output of the B1 amplifier.

The above description applies for the other phases in the three phase AC source 2, namely the V and W phase sequences.

As will be discussed in more detail below, the range of phase-control required for firing the SCRs is the last 180 electrical degrees of the timing wave, for each phase sequence.

Watchdog Function

The U, V, and W timing wave and watchdog circuits 26a, 26b, and 26c preferably each include a watchdog circuit which resets respective integrating amplifier circuits (such as the circuit containing amplifier C1), when respective integrating amplifier circuits not reset normally as described above. This is particularly important when an abnormality in the line-to-line voltage wave shapes of the AC source 2 prevent resetting at normal times.

With reference to the U timing wave and watchdog circuits 26a, the output of the inverting amplifier B1 is applied to a negative input terminal of a watchdog input comparator D1. A small DC bias voltage derived from VPKL-L, is applied to the positive input terminal of comparator D1. When the output of amplifier B1 goes negative (when the output of integrating amplifier C1 ramps up in a positive direction) the output of comparator D1 goes high and capacitor C5 charges in a positive direction. The charging rate of capacitor C5 is determined by the voltage at the PULL-UP REF terminal and resistor R107.

Under normal operating conditions, when the output of amplifier B1 goes positive (initiating the reset of integrator C1) the output of input comparator D1 goes low and C5 starts to discharge via R66. Resistor R66 preferably has a much lower value than R107 and, therefore, the discharge rate of the voltage across C5 (the watchdog ramp voltage, or watchdog ramp) is much faster than the charge rate.

When the voltage across capacitor C5 has not reached a threshold voltage (the watchdog switching threshold): (i) the output of an output comparator E1 remains high; (ii) the output of an output inverter F1 remains low; and (iii) integrator C1 receives no input through resistor R93. The watchdog switching threshold is input into the positive input terminal of output comparator E1.

Preferably, the output inverter F1 has no modifying effect on the output of integrator C1 when it ramps.

Figure 5C:
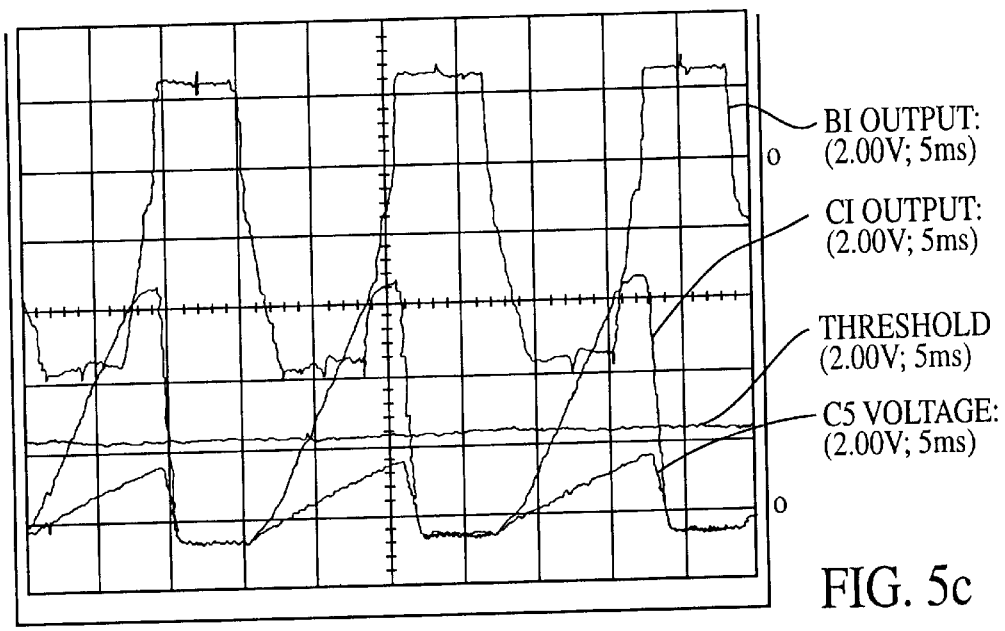

FIG. 5c shows the output waveform of amplifiers B1 and C1, the voltage across C5 (watchdog ramp) and the watchdog switching threshold.

Thus, if the integrator C1 does not reset normally (for example, because the output of amplifier B1 has not gone positive by the normal reset time), then: (i) the output of the output comparator E1 will go low shortly after the normal reset time; (ii) the output of output inverter F1 will go high, and current will be fed via resistor R93 to reset the integrator C1. The integrator amplifier circuit C1 will remain reset until the output of amplifier BE goes positive for a sufficient time to allow capacitor C5 to discharge below the DC bias voltage input to the positive input terminal of input comparator D1.

It is important that the watchdog ramp does not reset unless the integrating amplifier C1 resets. This requires controlled relationship between amplifier 21 and the DC bias input into amplifier E1. As is apparent to those skilled in the art, without this relationship it would be possible under some loss-of-line conditions for the output of the integrating amplifier C1 to float while a watchdog circuit resets.

Abnormal operating conditions during which the watchdog function is invoked are described below.

Temporary Loss Line

When all three line voltages of the AC source 2 are lost, the voltages at the input terminals of the SCRs in the rectifier bridge 11 do not immediately drop to zero. Indeed, residual line-to-line voltages remain that depend upon the stored voltage on the DC bus capacitor C. These residual voltages also depend upon whatever impedances remain connected across the terminals of the rectifier bridge 11 when the line voltages are lost. These impedances may be internal to equipment of which the rectifier 11 is a part (such as line-to-line snubber capacitors) or other external loads—balanced or unbalanced—that are connected to the same system.

Figure 5D:
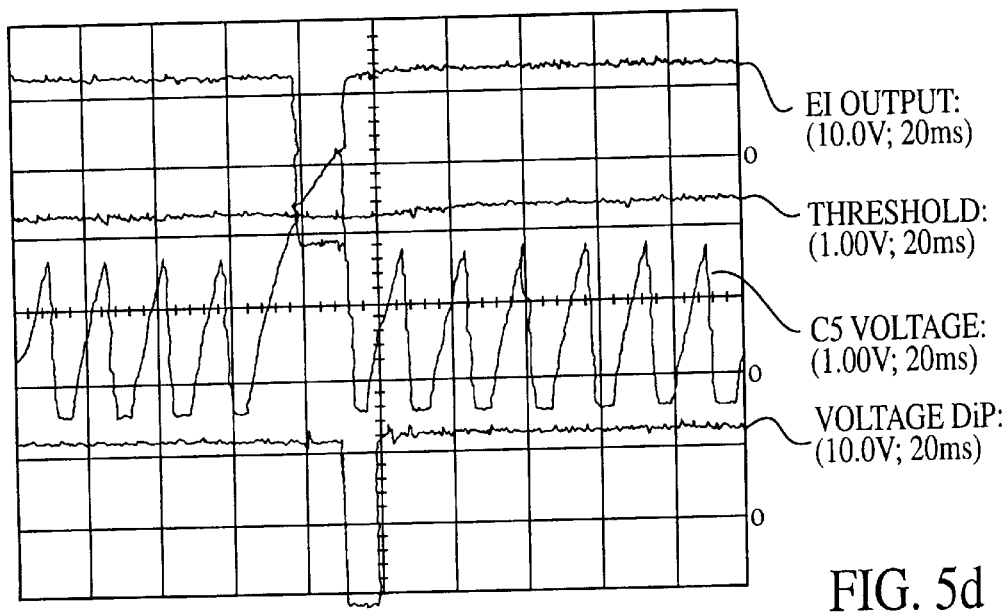

Under these circumstances, the output inverter F1 resets the integrator C1 and prevents the output thereof from positive saturation. FIG. 5d is a graph illustrating the output of the output comparator E1, the watchdog threshold voltage, and the watchdog ramp (C5 voltage). When the output of comparator E1 goes low, the output inverter F1 resets the integrator C1.

In general, the residual line-to-line voltages of the AC source 2 have decaying waveforms that provide negative input to at least one of the integrating amplifiers (such as C1). This will tend to make the output of the integrator C1 to ramp towards positive saturation. If the watchdog circuit does not reset the integrator C1 within one cycle of the normal start of its output (the timing wave), a grossly mis-timed SCR firing pulse and large jump in output voltage Vo can occur. This is particularly problematic when the line voltage reappears within one cycle and the output voltage, Vo, is regulated to a relatively low level.

Figure 5E:
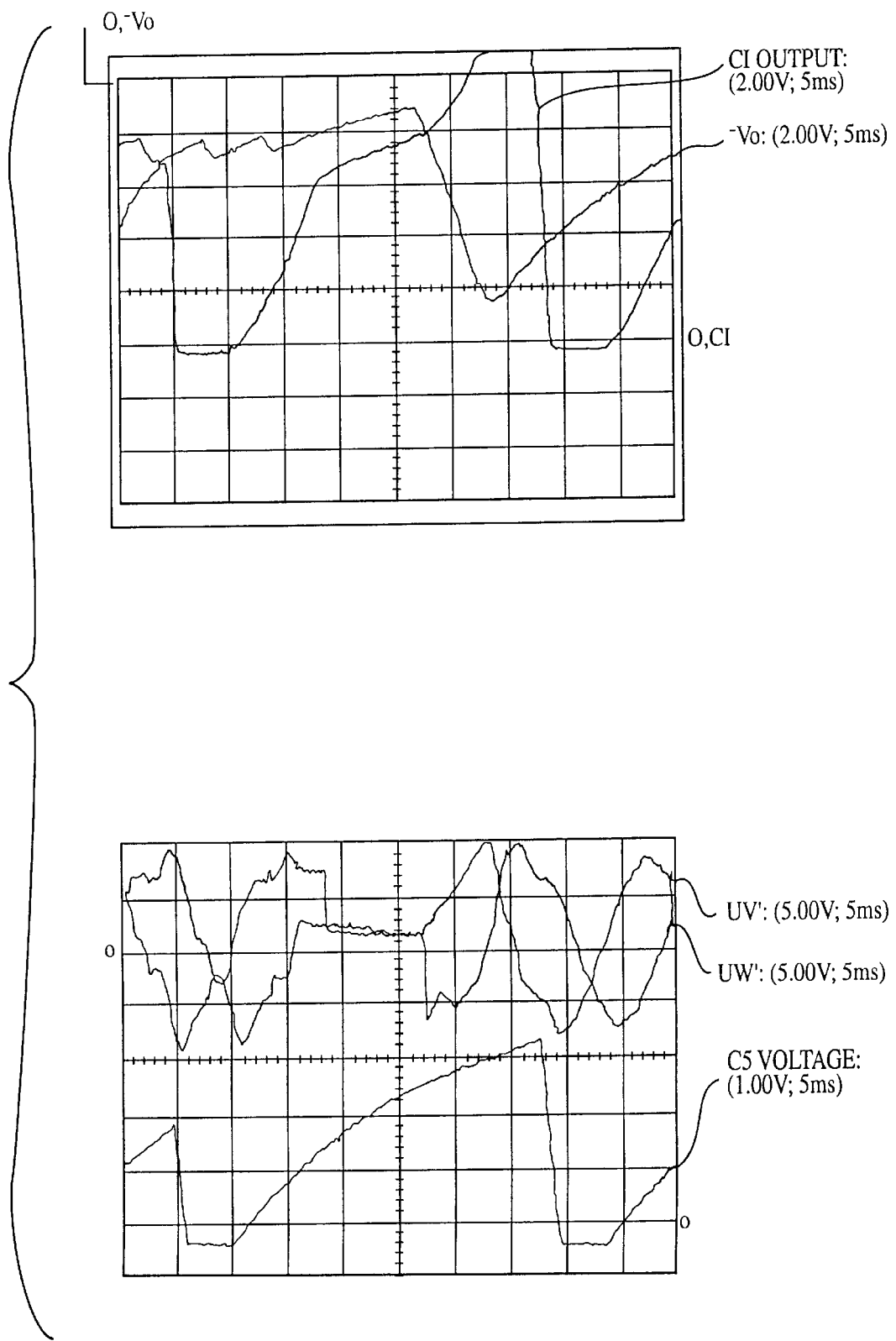

FIG. 5e is a graph illustrating a temporary loss of UV' and UW', a watchdog ramp (C5 voltage), an abnormally high—saturated timing wave (C1 output), and an undesirable jump in output voltage, Vo, when line voltages return. This condition may be simulated by setting an abnormally high watchdog switching threshold (not shown).

When one line voltage is lost during normal operation, the output of the integrator (e.g., output of C1) associated with that input phase is driven towards saturation. The associated watchdog circuit prevents this from occurring.

VPK Store

With reference to FIG. 4b, the soft start circuit 17 includes a VPK store circuit 28. The VPK store circuit produces a voltage, VPK, with a peak value essentially equal to a peak value of the timing waves.

Discharge Resistors R223 and R65 (M16 being biased on for 3-phase operation) are normally connected to ground via MOSFET M20 (FIG. 4c). The time constant of these resistors with capacitor C6 is selected such that VPK tracks changes of amplitude of the timing waves over input cycles, while maintaining an essentially smooth cycle-to-cycle value.

The voltage at the positive input terminal of buffer amplifier G1 is less than VPK, due to the voltage divider effect of the discharge resistors, R223, R65 with charging resistor, R224. The gain of buffer amplifier G1 is preferably set such that the output voltage of amplifier Gi is about equal to VPK.

The purpose of the charging resistor, R224, is to provide filtering against abnormally high transient peak output from the integrators (e.g. C1). This will occur during transient loss of input line voltage, during the interval between the normal reset time of the integrators, and when respective watchdog circuits reset the integrators.

Ramp Generator

Referring to FIG. 4c, the soft start circuit 17 includes a ramp generator circuit 30. The function of the ramp generator 30 is to produce an increasing voltage, VRAMP, across capacitor C8, during initial power-up. VRAMP sets the ramp-up rate of the rectified output voltage, Vo, by indicating the rate of phase advance of the firing pulses for the SCRs in the rectifier bridge 11.

VRAMP can rise only if the closed loop ramp clamp circuit 32 is not enabled. Assuming circuit 32 is not enabled, current flows from VPK (i.e., the output of buffer amplifier G1, FIG. 4b), through R30 and charges C8.

C8 tends to charge exponentially towards VPK, with a time constant of C8*R30. Since the output voltage, Vo, of the rectifier bridge 11 rises as a function of VRAMP, as VRAMP rises exponentially, Vo rises in a non-linear fashion, and the total rise time to full output voltage Vo is unnecessarily slow.

A parabolically rising VRAMP yields an approximately linear rise in rectifier bridge 11 output voltage, Vo. This allows the output voltage, Vo, to be ramped up to the full value in the shortest practical time (i.e., consistent with limiting the bus capacitor C charging current).

Ramp Shaping circuit

The ramp generator circuit 30 includes a ramp shaping circuit comprising an operational amplifier and biasing resistors R139, R140 and R149. The ramp shaping circuit provides VPAMP with a parabolic shape.

The voltage across C8 is applied to the positive input terminal of the operational amplifier and the voltage at the output of this amplifier is boosted above VRAMP by the ratio of R139 to R149. This boosted voltage is connected back to C8 via R140, providing an additional charging current for C8. The additional charging current for C8 increases as VPAMP increases, resulting in a parabolic rise of VRAMP.

Figure 5F:
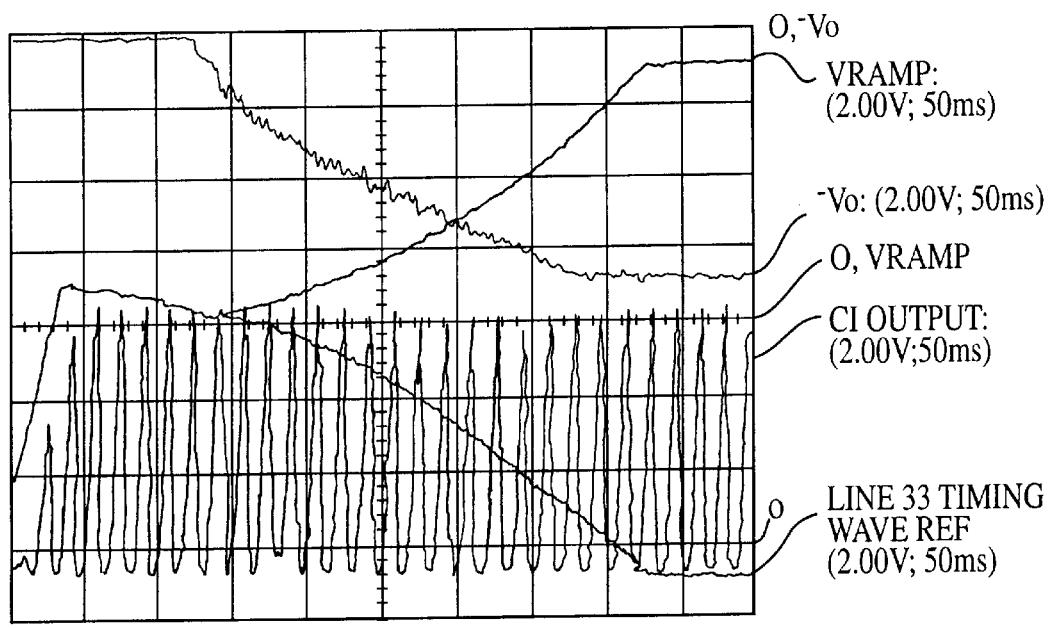

FIG. 5f is a graph illustrating the parabolic rise of VRAMP which produces an approximately linear rise of output voltage, Vo.

Closed Loop Ramp Clamp circuit

When the ramp clamp enable MOSFET M8 is off, the ramp clamp MOSFET M10 is driven into conduction via an error amplifier. The error amplifier compares the bus capacitor C feedback voltage, −VoFB, via R77, with VRAMP, via R70. The amplified error between these two voltages drives the ramp clamp MOSFET M10 on, which diverts charging current from C8 and forces VRAMP to be essentially equal to R70/R77×|VOFB|.

At power-up, during initial undervoltage lockout, the ramp clamp circuit 32 is enabled. Thus, when |VoFB| is zero (e.g., at switch-on of the AC source 2), VRAMP will be zero. If |VoFB| has an initial value at power-up (e.g., following a brief line outage), VRAMP will be regulated to the value of R70/R77×VOFB until the ramp clamp circuit 32 is disabled.

The purpose of regulating VRAMP to be about equal to R70/R77×|VoFB| during the undervoltage lockout period, is to provide an initial value for VRAMP before ramp up starts. This avoids time delay while VRAMP catches up to a pre-existing level of output voltage, Vo (if any).

The ramp clamp circuit 32 is also enabled during transient line voltage outages that result in significant reductions of the DC output voltage, Vo. By forcing VRAMP to be proportional to |VoFB| during a transient line voltage outage, the amplitude of VRAMP when the line voltage returns is preset so that ramp-up of the voltage across the DC bus capacitor C occurs without undue delay. This occurs without an initial surge of recharging current into the bus capacitor C, which would occur if the amplitude of VRAMP was too high.

The ratio of R70/R77 is preferably set by external resistors when the soft start circuit 17 is implemented as an ASIC.

The ratio is a function of VRAMP and the output voltage, Vo. The relationship between VRAMP and Vo is non-linear when no filter inductor L is used with DC bus capacitor C. Indeed, a parabolic VRAMP produces an approximately linear increase of output voltage, Vo. Vo initially increases rapidly as VRAMP is increased from zero, but the rate at which Vo rises will reduce at higher values of Vo. The ratio R70/R77 is preferably set so that VRAMP is forced to a value that delivers the correct output voltage, Vo, at about 50% of maximum output voltage.

In general, the choice of R70/R77 is a compromise between delay time in ramping the output voltage, Vo, (when the input line voltage reappears after loss-of-line) and an initial jump of output voltage, Vo, (when the line voltage returns, i.e., as the firing angle of the SCRs is advanced). Indeed, as delay time is reduced and the re-entry firing angle is too far advanced, an excessive jump in output voltage, Vo, will occur.

Figure 5G:
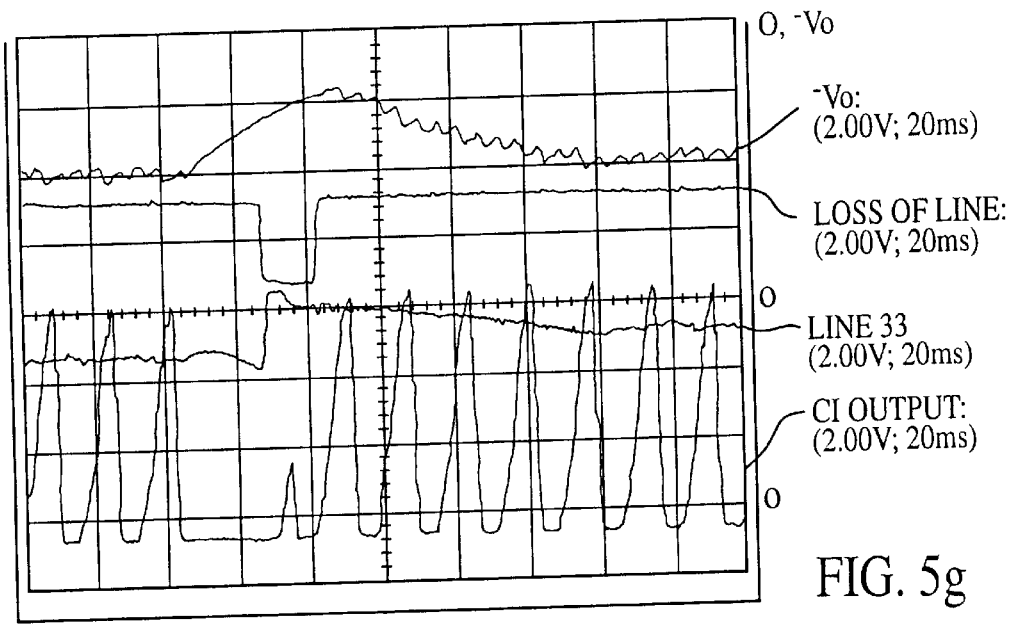

FIG. 5g is a graph illustrating the output voltage, Vo during a temporary loss of line, when R77=430 Kohms and R70/R77=0.23. There is no jump in Vo when line voltage is restored.

Figure 5H:
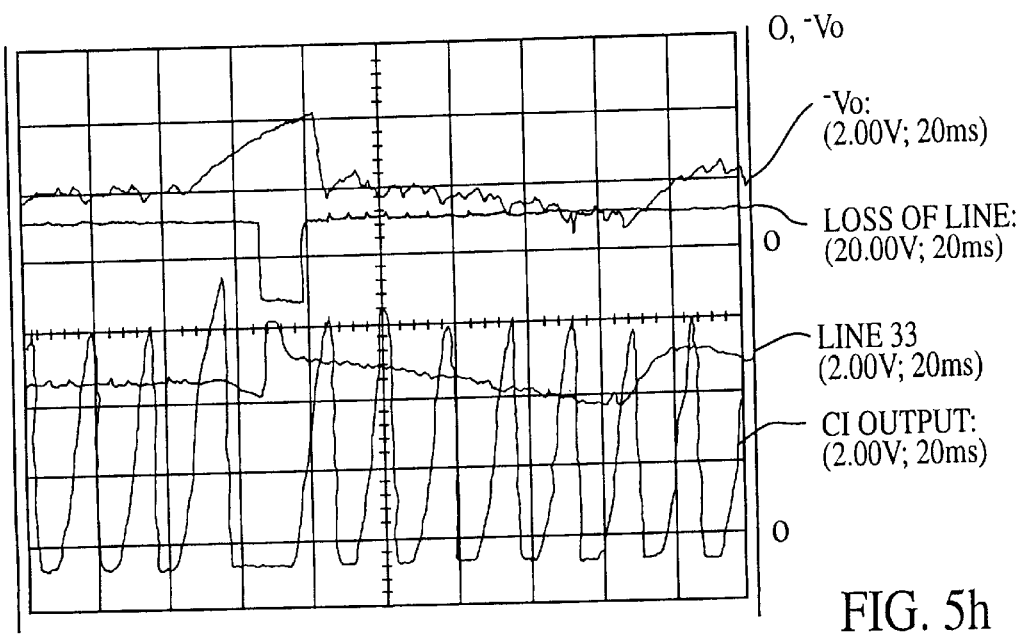

FIG. 5h is a graph illustrating the output voltage, Vo during a temporary loss of line, when R77= 200 Kohms and R70/R77=0.5. There is a jump in Vo when line voltage is restored.

With an inductor L between the output of the rectifier bridge 11 and the bus capacitor C, the relationship between VRAMP and Vo is more linear. For this situation, the ratio R70/R77 would be set at a higher value than without inductor L in order to achieve optimum response after loss of line voltage.

Timing Reference Summing Amplifier

With reference to FIG. 4c, the soft start circuit 17 includes a timing reference summing amplifier H1 having an output which provides a timing wave reference voltage on line 33. The timing wave reference voltage on line 33 is coupled to: (i) a U SCR timing comparator circuit 36a; (ii) a V SCR timing comparator circuit 36b; and (iii) a W SCR timing comparator circuit 36c (FIG. 4b).

The timing wave reference voltage (line 33) is essentially equal to the difference between VPK and VRAMP (provided that the output of amplifier 48 is zero). Thus, when VRAMP is zero, the timing wave reference voltage (line 33) is essentially equal to VPK.

The timing reference summing amplifier H1 inverts VRAMP and, therefore, as VRAMP increases the timing wave reference voltage (line 33) decreases (FIG. 5f).

SCR Gating Pulses

For minimum output voltage, Vo, from the rectifier bridge 11, the firing angle for the SCRs must occur just prior to the negative-going zero crossing of the respective line-to-line input voltages. For higher regulated values of Vo, the firing angle for the SCRs must occur progressively earlier than the negative-going zero crossing of the respective line-to-line input voltages. Assuming that the negative-going zero crossing of the respective line-to-line input voltages is 180°, then the firing angle for the SCRs must occur at progressively smaller angles than 180°.

Referring to FIG. 4b, to achieve the above function, the soft start circuit 17 employs the U SCR timing comparator circuit 36a; the V SCR timing comparator circuit 36b; and the W SCR timing comparator circuit 36c to compare the timing wave reference voltage on line 33 to the respective outputs of integrator C1, and the integrators for the V and W phases. In particular, each comparator circuit 36a, 36b, and 36c includes an intersection comparator (e.g., comparator I1 for the U phase) for comparing the timing wave reference voltage on line 33 to, for example, the output of integrator C1.

The outputs of the intersection comparators (e.g., comparator I1) define the initiation points for the SCR firing pulses. Each intersection comparator attempts to produce a high output whenever the timing wave from an associated integrator (e.g., C1) becomes greater than the timing wave reference voltage (line 33).

In order to avoid excessively high in-rush currents into the DC bus capacitor C at start up, the intersection points of the timing wave reference voltage on line 33 with the outputs (timing waves) of the integrator amplifiers (e.g., C1) should occur at or near the peaks of the timing waves. Thus, the timing wave reference voltage (line 33) should essentially be equal to VPK at start up.

As the timing wave reference voltage (line 33) ramps down, intersection with the timing waves occurs at earlier and earlier times, resulting in earlier firing angles for the SCRs. Thus, the output voltage, Vo ramps up toward its set value.

SCR Voltage Comparators.

The soft start circuit 17 also includes a U SCR voltage comparator (J1), a V SCR voltage comparator, and a W SCR voltage comparator. These SCR comparators compare the instantaneous anode to cathode voltage of each SCR with a fixed reference, V SCRREF (line 35). This reference is set to represent an actual anode to cathode SCR voltage (before attenuation at any feedback resistors) of about 15 to 30 V.

When the respective instantaneous SCR anode to cathode voltage is greater than about 15 to 30 V, the output of the associated SCR voltage comparator (e.g., J1) attempts to produce a high value, otherwise the output is low.

The outputs of the SCR voltage comparators are combined with the respective outputs of the intersection comparators (e.g., comparator I1 for the U phase) such that respective pairs of comparators must output a high value to produce a respective SCR firing pulse (for example, at line 37).

The respective SCR firing pulses are thus controlled so that (i) they do not occur when the respective output timing waves of the integrator amplifiers (e.g. C1) are less positive than the timing wave reference voltage on line 33; (ii) they do not occur unless the respective instantaneous SCR anode to cathode voltage is at least about 15 to 30 V positive; and (iii) they are terminated when the instantaneous anode to cathode voltage falls below about 15 to 30 V (i.e., after the SCR turns on).

Advantageously, the duration of the respective SCR firing pulses (e.g., the SCR firing pulse for the U phase, line 37) is dynamically controlled to ensure turn on of the respective SCR. Once the respective SCR is turned on, the associated firing pulse is automatically discontinued after a short delay.

It is preferred that a delay be introduced so the SCR firing pulse is held on for about 10 microseconds after the SCR voltage falls below about 15 to 30 V to ensure that the SCR is latched into conduction by the time the firing pulse is removed.

This dynamic control of the duration of the SCR firing pulses (i.e, adequate to ensure SCR turn on, but not excessive) is important in minimizing the average current consumed by the driver circuit 19 from the power supply 15. Increased current demand by the driver circuit 19 from a snubber derived power supply 15 could require snubber capacitors with a larger value than needed for dv/dt protection of the SCRs.

The SCR voltage comparators also function to prevent the initiation of firing pulses when the respective instantaneous SCR voltages are negative. Without this function, firing pulse could occur when the crossover points of the timing wave reference voltage (line 33) with the integrator outputs (e.g., C1 output timing wave) fall ahead of the zero-crossing of the SCR voltages, or when the timing wave reference voltage falls permanently below the integrator outputs (e.g., when the rectifier is fully on).

Closed Loop Voltage Regulation circuit

The soft start circuit 17 also includes a closed loop voltage regulation circuit 34 (FIG. 4c) which adjusts the timing wave reference voltage (line 33) under non-start up conditions.

The closed loop voltage regulation circuit 34 includes a −VoREF inverting amplifier 42, an error polarity comparator 44, a Vo error inverting amplifier 46, a Vo error buffer amplifier 48, and other associated circuit components. The output voltage reference signal, −VoREF, sets the amplitude of the steady state DC output voltage, Vo, via closed loop control. Preferably this is an externally applied voltage and is negative with respect to "ground", i.e., with respect to the positive output terminal of the rectifier bridge 11.

The −VoREF inverting amplifier 42 inverts the reference to +VoREF. The difference between +VoREF and a feedback signal from the output voltage Vo, labeled −VoFB, is amplified and inverted by the VoERROR inverting amplifier 46.

The output of this amplifier is filtered by R185, R186, and C28, so that a smooth voltage representing the DC error (error voltage) between VoREF and VoFB, appears across C28. The error voltage is input into the VoERROR buffer amplifier 48.

The output of the VoERROR buffer amplifier 48 is input to the timing reference summing amplifier H1.

If |VoFB| is less than VoREF, the error voltage is negative, the output of the error polarity inverting comparator 44 is positive, and a negative error bypass MOSFET M17 is turned on. When M17 is on, it holds the positive input terminal of the VoERROR buffer amplifier 48 at essentially ground potential. The output of the VoERROR buffer amplifier 48 is thus essentially zero. The voltage regulation loop, therefore, has no influence on the output of the timing wave summing amplifier H1 or on the timing wave reference voltage (line 33).

If |VoFB| exceeds VoREF, the error voltage becomes positive and the negative error bypass MOSFET M17 is turned off. Thus, the input to the positive terminal of the VoERROR buffer amplifier 48 becomes about equal to the error voltage. The output of the VoERROR buffer amplifier 48 increases (in a positive direction) and the error voltage applied to the timing reference summing amplifier H1 increases the timing wave reference voltage (line 33), thereby retarding the SCR firing angle. This closed loop action corrects errors in the output voltage, Vo.

Since the closed loop voltage regulation circuit 34 becomes active only when VoFB starts to exceed VoREF and VoREF always has some finite value, the circuit has no effect on the ramp up rate of the output voltage Vo during start-up. The ramp-up rate at start-up is determined solely by the rate of increase of VRAMP until the output voltage reaches a level at which |VoFB| starts to exceed VoREF.

In order to minimize voltage overshoot of the output voltage Vo, the charging time of C28 should be relatively short. This charging time is set essentially by R185 and C28. It is desirable that the discharge time of C28 (set by R186) be longer than the charging time. This prevents the error voltage from decaying too rapidly during transient loss of line, which would result in the re-entry firing angle being too far advanced, and hence in excessive recharging current to the DC bus capacitor C when the line voltage returns.

Note that after initial ramp-up of the output voltage Vo has been completed, and normal steady state operation is attained, the amplitude of VRAMP settles at about VPK, regardless of the value of −VoREF. Thus, after start-up, the output voltage Vo is no longer under control of the ramp voltage, VRAMP.

Adjustment of loop gain

If the voltage regulation loop exhibits ripple instability, i.e., uneven firing angle from one SCR to the next, the loop gain should be reduced—at the expense of reducing the tightness of the voltage regulation. With reference to FIG. 4c, adjusting the loop gain is made via the D60/R186 node to the RA/RB node and adjusting the potential divider resistors RA and RB (which are preferably external when the soft start circuit 17 is an ASIC or IC).

Timing Reference Clamp Circuit

The soft start circuit preferably includes a timing wave reference clamp circuit including amplifier 50 and associated circuit components (FIG. 4c). This circuit clamps the maximum value of the timing wave reference voltage (line 33) to slightly less than VPK, i.e., to slightly less than the peak value of the timing waves (output from integrators, e.g., C1), whenever the voltage regulation loop is active. This ensures that "end stop" intersection points for the SCR firing pulses are always produced when the output voltage Vo is being regulated. This also ensures against missing firing pulses, which could otherwise occur due to the error voltage transiently pushing the timing wave reference voltage (line 33) above the peaks of the timing waves.

The output of the error polarity comparator 44 is low whenever the error voltage is positive. Thus, the output of the inverter comparator 52 is high whenever the output of the error polarity comparator 44 is positive. Under this condition, D65 s forward biased, and the output of the timing wave reference clamp amplifier 50 is essentially equal to the voltage at its positive input terminal. This voltage is preferably a fraction (about 98%) of VPK. The timing wave reference voltage (line 33) is clamped to this value, via D70.

When the error voltage is negative (indicating that the voltage regulation circuit is essentially inoperative) the output of the inverter comparator 52 becomes low. D65 is thus reversed biased, and the output of the timing reference clamp amplifier 50 becomes essentially equal to Vdd (the control power supply level), removing the clamp from the timing wave reference voltage (line 33).

When the output of the timing reference clamp amplifier 50 becomes essentially equal to Vdd, the timing wave reference voltage (line 33) is free to exceed VPK. This is the case during initial power-up, when the timing wave reference voltage (line 33) initially approaches the timing wave peaks from a level somewhat higher than VPK. This ensures that the first SCR firing pulse is retarded as much as possible, to keep the first jump of output voltage Vo as small as possible.

Voltage Dip circuit

The DC bus output voltage Vo will fall if the input line voltage decreases or is lost altogether. For short-term reduction or loss of line voltage, the DC bus capacitor C may maintain the DC output voltage sufficiently that system operation can continue without interruption.

It is important that the charge on the DC bus capacitor C is restored as quickly as possible when the line voltage returns, without excessive capacitor recharging current. It is important that the SCR firing control circuit is able to respond quickly, to minimize the effects of short-term line voltage interruption.

With reference to FIG. 4c, the soft start circuit 17 preferably includes a voltage dip circuit 54 which monitors dips at the DC bus output voltage Vo. The voltage dip circuit 54 includes a voltage dip comparator 56, a Vo reset MOSFET M24, an hysteresis reset MOSFET M26, and associated circuit components.

So long as the DC bus voltage feedback signal, −VoFB, does not dip below a preset fraction, k, of an initial value, the voltage dip comparator 56 is not activated and the timing wave reference voltage (line 33) is allowed to float essentially at its pre-dip value during short-term line outage. Thus, when the line voltage returns, the re-entry firing angle is essentially the pre-dip firing angle. (This assumes that the amplitude of the returning line voltage has the same amplitude as the pre-dip value). The DC bus voltage Vo thus rapidly recharges to the pre-dip value when the input line voltage returns, without introducing delay due to SCR phase control.

Since this rapid recharge is achieved without active limiting of the recharging current, it can be permitted only if VoFB has not dipped too much during the line voltage outage (i.e., not below k×VoFB, where VoFB is the pre-dip value and k is typically about 0.7).

If VoFB dips below k×VoFB, then the ramp voltage VRAMP is clamped to a set fraction of VoFB, by enabling the ramp clamp circuit 32. In this event, the error voltage (across C28) is clamped to zero, as soon as the ramp voltage VRAMP has been clamped. The circuit is now set to provide the desired re-entry firing angle when the line voltage returns.

In normal operation, the output of the NAND gate 58 is high, which drives the Vo reset MOSFET M24 off, and the hysteresis reset MOSFET M26 on. The output voltage feedback signal, −VoFB, is stored on capacitor C1. The voltage dip comparator 56 compares a fraction, k=R112/(R111+R112) of the C1 voltage with −VoFB.

In normal operation, |k×VoFB| is less than |VoFB|, and the output of the voltage dip comparator 56 is high. When the output of the voltage dip comparator 56 is high, it has no active effect on system operation.

When a short line outage occurs, the voltage captured on C1 remains substantially constant and equal to the pre-dip value, while |VoFB| itself starts to decrease as the bus capacitor C discharges. If this decrease is insufficient to drive the output of the voltage dip comparator 56 low, the ramp voltage, VRAMP, stored on CRAMP, and the error voltage on the error capacitor C28 essentially hold their pre-dip values, and thus the timing wave reference voltage (line 33) essentially holds its pre-dip value, until the line voltage returns. Thus, the re-entry firing angle is equal to the pre-dip firing angle.

If the DC bus voltage Vo dips to less than k×the pre-dip value, the output of the voltage dip comparator 56 latches low. The output of the voltage dip comparator 56 remains latched low so long as the output of the NAND gate 58 remains high. This is so because this output drives the hysteresis reset MOSFET M26 on, pulling the positive input terminal of the voltage dip comparator 56 low and keeping the output of that comparator low.

When the output of the voltage dip comparator 56 goes low, the following occurs:

a) The clamp enable MOSFET M8 is switched off which enables the local ramp clamp closed loop circuit 32 and clamps the ramp voltage VRAMP to a set fraction of VoFB, as previously described.

b) As soon as the ramp voltage VRAMP is clamped, the output of the ramp error amplifier falls essentially to the threshold voltage of the ramp clamp MOSFET M10. This causes the output of the ramp clamp detect comparator 60 to start to go high. Capacitor C2 in combination with R196 slows the rise time of the output of this comparator so that it does not reach a sufficient level for the output of the NAND gate 58 to go low, during a "hangover" period. The hangover period is a period of time when the output of the timing wave intersect comparator 62 remains high, even though the input line voltages have disappeared. The hangover period is caused by the timing wave integrators (e.g., C1) not being reset immediately by the respective watchdog circuits when the line voltage disappears. If the output of the NAND gate 58 went low during the hangover period, premature resetting of the voltage dip comparator 56 would occur.

After some delay, the output of the ramp clamp detect comparator 60 turns on the Vo error discharge MOSFET M15, rapidly discharging the error voltage across C28 to zero.

As the above sequence (a–b) takes place, the output of the timing reference summing amplifier H1 first goes higher as the ramp voltage VRAMP is clamped, then moves back lower as the error voltage (across C28) is discharged. The output of the timing reference summing amplifier H1 settles at a value that is equal to the difference between VPK and VRAMP, VRAMP being a set fraction, (R70/R77), of VoFB. FIGS. 5g, 5h depict these waveforms as a function of R70/R77.

This circuit ensures that the ramp voltage VRAMP is clamped before the error voltage is discharged and, therefore, the timing wave reference voltage (line 33) first moves up before it moves back down. If the error voltage were discharged before the ramp voltage VRAMP is clamped, the timing wave reference voltage (line 33) would move down before it moves back up. If the input line voltage returns just as the timing wave reference voltage (line 33) moves downward, a premature SCR firing pulse would be generated. This would cause excessive inrush current to the DC bus capacitor C.

According to the invention, the timing wave reference voltage (line 33) may be automatically set at a level that will produce an approximately correct re-entry firing angle when the input line voltage returns, as previously described. This controls the output voltage Vo to ramp back to its pre-outage value without undue delay, and without excessive recharging current of the DC bus capacitor C when the line voltage returns.

When the output of the voltage dip comparator 56 goes low the VPK discharge MOSFET M20 is turned off (FIG. 4c). This disconnects the VPK discharge resistors R223, R65 from ground (FIG. 4b) and allows the VPK store capacitor C6 to hold its charge during the line outage. This is important because decay of VPK during line outage would result in the re-entry firing angle being too far advanced when the line voltage returns.

The voltage dip comparator 56 is reset when the output of the NAND gate 58 goes low. During a line outage, input 1 to the NAND gate 58 becomes high when the output of the ramp clamp detect comparator 60 goes high. Input 2 to the NAND gate 58 is the output of the timing wave intersect comparator 62. This compares a fraction of the timing wave reference voltage (line 33) with the composite timing wave signal, line 39 (the rectified "sum" of the timing waves, FIG. 4b).

During line outage, after the initial hangover period described above, the composite timing wave (line 39) falls to zero, thus the output of the timing wave intersect comparator 62 goes low. This output remains low until the line voltage returns; the output then goes high. Input 2 of the NAND gate 58 then goes high and the output of the NAND gate 58 goes low.

When this occurs, the Vo reset MOSFET M24 is turned on, discharging the stored voltage across the Vo store capacitor C1. Simultaneously, the hysteresis reset MOSFET M26 is turned off. The positive input terminal of the voltage dip comparator 56 now becomes more positive than the negative input terminal, and its output goes high.

The ramp clamp enable MOSFET M8 turns on, disabling the local ramp clamp closed loop circuit 32. The output of the ramp error amplifier increases and the output of the ramp clamp detect comparator 60 goes low, turning off the Vo error discharge MOSFET M15. The output of the NAND gate 58 goes high, the Vo reset MOSFET M24 is turned off, and the Vo store capacitor C1 recharges to −k×VoFB.

Normal operation is then restored.

Voltage Dip During Dynamic Regulation of Output Voltage.

When the output voltage reference, −VoREF, is rapidly decreased (i.e., when it changes to a smaller negative value) to sufficient degree, the output voltage Vo will decrease and the voltage dip comparator 56 will activate. This will clamp the ramp voltage VRAMP and reset the error voltage (C28) to zero, just as if the voltage dip had been caused by loss of input line voltage. The SCR firing angle may then become temporarily too far retarded, and the output voltage Vo may undershoot the set value.

Since the input line voltage and timing waves are still present, however, the output of the timing wave intersect comparator 62 remains, or toggles high, which quickly discharges the voltage stored across the Vo store capacitor C1 and resets the voltage dip comparator 56. This un-clamps the ramp voltage VRAMP, turns off the Vo error discharge MOSFET M15, and allows the ramp voltage VRAMP to drive the output voltage Vo back to the set level.

At this point the regulator circuit 34 attempts to regulate the output voltage Vo to the new set value, (while the ramp voltage VRAMP continues to increase to its maximum value). Thus, the output voltage Vo may undershoot. The undershoot may be avoided by eliminating sudden large reductions of the output voltage Vo. Thus, if changes in −VoREF occur at a rate that does not significantly "overtake" the discharge rate of the Vo store capacitor C1, activation of the voltage dip comparator is avoided.

UV/Phase Loss-Inhibit circuit

The soft start circuit 17 preferably includes a UV/phase loss-inhibit circuit 70 (FIG. 4c). The UV/phase loss-inhibit circuit 70 delivers a UV (under voltage) signal that is low when the main Vdd power supply voltage is below a set minimum. This occurs during initial power-up or during prolonged loss of input line voltage. A low UV signal turns on the fast charge MOSFET M23 (FIG. 4b) during initial power-up which allows the VPK store capacitor C6 to be rapidly charged to VPK and reduces the delaying action of R224.

The UV/phase loss-inhibit circuit 70 delivers a UV/phase loss signal (line 72) that is low (i) when the UV signal (line 74) is low; or (ii) when the phase loss integrating capacitor C26 is discharged below a set level. This is the case when one input phase becomes missing for more than about three half cycles.

When the UV/phase loss signal (line 72) is low, the clamp enable MOSFET M8 is switched off and the closed loop ramp clamp circuit 32 clamps the ramp voltage VRAMP to a set fraction of VoFB. The outputs of the timing wave comparators (e.g., I1, FIG. 4b) are also pulled low, inhibiting the SCR firing pulses (e.g., line 37).

Loss-of-Line Detection circuits

The soft start circuit 17 preferably includes a loss of line detection circuit 78 (FIG. 4c) and performs the following functions:

One phase loss detection and shut down

A train of fixed-duration pulses at two times the line frequency are delivered to the gate of the phase loss discharge MOSFET M19 when one input phase is missing. Each time MOSFET M19 is turned on the phase loss integrating capacitor C26, is discharged by a set amount. Recharging of C26 via R168 in between discharge pulses is relatively slight because the time constant C26×R168 is much longer than a half cycle.

After two to three successive 1-phase loss pulses, the phase loss integrating capacitor C26 is sufficiently discharged such that the output of the phase loss inhibit comparator 76 goes low. This enables the ramp clamp circuit 32, which clamps the ramp voltage VRAMP and disables the SCR firing pulses.

Requiring two or three successive 1-phase loss pulses before shutting down the SCRs avoids nuisance trips. Quickly shutting down the rectifier when one input phase is lost is important because if the output voltage Vo is being regulated to a relatively low level and a missing phase returns, the re-entry firing angle can be too far advanced, causing a large jump of output voltage Vo and excessive recharging current to the DC bus capacitor C.

The train of fixed duration 1-phase loss pulses is obtained via the 3-phase/1-phase comparator 80 which compares the composite timing wave (line 39) with a fraction of VPK. During normal operation, the output of the 3-phase/1-phase comparator 30 is permanently high because the composite timing wave (line 39) is always greater than the set fraction of VPK. If one input phase is missing, however, the output of the 3-phase/1-phase comparator 80 toggles at twice the line frequency.

When the output of the 3-phase/1-phase comparator 80 toggles low, the voltage across C23 discharges, although this does not effect the output of the 1-phase loss comparator 82 (which is pulled low via D26) so long as the output of comparator 80 is low.

When the output of the 3-phase/1-phase comparator 80 toggles high, the output of the 1-phase loss comparator 82 goes high for a set period (determined by the time for C23 to charge via R234) to the switching threshold of the 1-phase loss comparator 82. At this point, the output of this comparator goes low.

When the output of the 1-phase loss comparator 82 is high, MOSFET M18 turns on (i.e., when one input phase is missing) for a set period, twice per cycle. The input of an opto-coupler can be connected between ground (positive) and the 1-phase loss terminal (line 40). This provides an isolated feedback signal that toggles on and off during loss of one input phase. The phase loss integrator discharge MOSFET M19 can be disabled by connecting the 1-phase shut down disable terminal (line 41) to Vss.

Three phase Loss Detection

In normal operation, the output of the 3-phase/1-phase comparator 80 is high, M22 is on, the output of the 3-phase loss comparator 84 is high, and M21 is on. If 3-phase power is lost, the output of the 3-phase loss comparator 84 goes low after a delay of about 1½ cycles (the delay is set by R240 and C32). When the output of this comparator goes low, M21 switches off.

The input of an opto-coupler can be connected between ground (positive) and the 3-phase loss terminal (line 85) to provide an isolated feedback signal. When 3-phase power is present, M21 is on, and this opto-coupler is energized. When 3-phase power is missing, M21 is off, and the opto-coupler is de-energized.

The output of the 3-phase loss comparator 84 feeds a level shift comparator 86 which drives the gate of the VPK discharge MOSFET M20. When loss of 3-phase power is detected, the output of the level shift comparator 86 goes low, turning off the VPK discharge MOSFET M20 and preventing discharge of the VPK store capacitor C6 (FIG. 4b).

By connecting the 1-phase/3-phase terminal (line 87) to the 1-phase loss terminal (line 40), a single opto-isolator connected between ground and the 3-phase loss terminal (line 85) provides a multiplexed signal for both 1-phase and 3-phase loss. Continuous energization of the opto-coupler denotes normal operation while toggling of the opto-coupler denotes that one input phase is missing. Continuous de-energization of the opto-coupler denotes that all three input phases are missing.

Dedicated One Phase operation

The soft start circuit 17 can be set for dedicated operation of a 1-phase SCR bridge. The U and V input terminals are connected to a 1 phase AC source while no connection is made to the W input terminal (FIG. 4a). The dedicated 1-phase terminal (line 21) is connected to Vss.

This has the following effects: With reference to FIG. 4a, VW', WV', WV' and UW' are pulled to Vss, leaving only UV' and VU' as active signals that represent the UV and VU line voltages respectively. With reference to FIG. 4b, the diode OR of lines UV' and UW' is a positive 180° half-sine wave that represents the positive half cycle of the UV line voltage, and the diode OR of lines VW' and VU' is a positive 180° half-sine wave that represents the negative half cycle.

Thus, the integrator C1 delivers a 180° timing wave for the U SCR firing pulse. The integrator for the V phase terminal delivers a 180° timing wave for the V SCR firing pulse. The integrator for the W phase terminal has no input and does not deliver a timing wave.

With reference to FIG. 4b, MOSFET M16 is off, removing R65 from parallel connection with R223 and increasing the net value of the VPK discharge resistor. With single phase operation, the voltage reduction on the VPK store capacitor C6 is greater for a given value of discharge resistance than it is for 3-phase operation. The higher value of discharge resistance for one-phase operation yields the same voltage on the VPK store capacitor C6, relative to VPK, as is obtained with three-phase operation.

MOSFET M11 is turned on. This connects R179 in parallel with R85, and reduces the switching threshold voltage for the watchdog comparator (e.g. E1 for the U phase). The Watchdog time-out period is thus reduced to be compatible with the 180° timing waves obtained with 1-phase operation versus the 240° timing waves for 3-phase operation.

With reference to FIG. 4c, the phase loss discharge MOSFET 19 is OFF. This prevents M19 from toggling as it would tend to do during 1-phase operation. If toggling occurred, C26 would be discharged, the output of the phase loss inhibit comparator 76 would be low, and the SCR firing pulses would be inhibited.

Effect of Line Voltage Amplitude

For given line frequency, the timing waves (outputs of integrators, e.g., C1), VPK, VPKL-L, the maximum value of VoFB, and the maximum value of the ramp voltage VRAMP (i.e., VPK) are derived from, and their amplitudes are directly proportional to, the amplitude of the AC line voltage. Since the amplitudes of all the above signals vary with each other and with the line voltage, they invariably have the same magnitude relative to each other.

Since the SCR firing angles are determined by the relative levels of these signals, and since these relative levels do not change, system operation is independent of the amplitude of the line voltages in the following respects:

1. Relationship between ramp voltage VRAMP (as per unit of maximum value for that line voltage) and output voltage Vo (as per unit of maximum value for that line voltage).
2. As a result of (1), the ramp-up time is independent of line voltage amplitude.
3. Relationship between the error voltage (as per unit of maximum value for that line voltage) and output voltage Vo (as per unit of maximum value for that line voltage).
4. As a result of (3), the gain of the voltage regulation loop is independent of line voltage amplitude.
5. Relationship between −VoFB (FIG. 4c) (as per unit of maximum value for that line voltage) and level at which the ramp voltage VRAMP is clamped (as per unit of the maximum ramp voltage VRAMP for that line voltage).
6. As a result of (6), the re-entry firing angle after loss-of-line for any given amplitude of Vo as per unit of Vo max remains constant.

Effect of Line Frequency

The soft start circuit 17 operates at either 50 or 60 Hz. The line frequency has the following effects on the operation: At 50 Hz, the amplitude of the timing waves (also VPK and maximum ramp voltage VRAMP) is 6/5=1.2×the amplitude at 60 Hz. Thus, a given change of error voltage at the output of the error buffer amplifier 48 results in a proportionally smaller change of output voltage than it does at 60 Hz. The loop gain at 50 Hz is therefore 1/1.2=0.833×the value at 60 Hz. This has virtually unnoticeable impact on the operation of the closed loop voltage regulator circuit.

The amplitude of the watchdog ramp voltage (e.g., at C5) at 50 Hz is 1.2×the amplitude at 60 Hz. The switching threshold for the watchdog comparator (e.g., E1) is set slightly higher (about 10%) than the peak of the watchdog ramp at 50 Hz. At 60 Hz, the margin between the peak of the watchdog ramp and the switching threshold therefore increases to about 32%. Thus, at 60 Hz the timing wave may overrun by about 72 degrees before it is shut down by the watchdog (versus about 24 degrees at 50 Hz). The larger overrun at 60 Hz results in an increase at the output of the timing wave integrator C1 and, hence, of VPK during transient loss-of-line voltage. This in turn means somewhat retarded re-entry firing angle at 60 Hz versus 50 Hz (after loss-of-line) and increased delay of ramp-back of the output voltage Vo when the input line voltage returns.

Low output frequency

The voltage control function of the soft start circuit 17 allows the output current of a motor drive inverter that is fed from the output voltage Vo of the rectifier to be increased at low output frequency. In some cases the increase of current is significant enough that it would result in a reduction of inverter die size for a given motor rating. Also, in many cases it is possible to increase the low speed starting torque above the full speed value, with no penalty in die size—a desirable feature.

At low motor speed, the instantaneous junction temperature of inverter IGBTs tends to follow the amplitude fluctuation of the low frequency motor current. Because there is little averaging of junction temperature over the duration of the output cycle at low speed, the permissible inverter output current is significantly less at low speed than at high speed.

If the DC bus voltage is reduced at low speed, the inverter switching losses are correspondingly reduced. For a given peak TJ-C, the inverter output current can be increased relative to the permitted value at full bus voltage. The increase in output current at low speed at reduced bus voltage will be greatest in designs where the switching losses are significant.

The foregoing description of the preferred embodiments of the present invention has been provided for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A soft start circuit for controlling a rectifier circuit, the rectifier circuit for converting power from an AC source having one or more phases to DC power having an output voltage (Vo) from a Vo+ node to a Vo− node, the rectifier circuit including: (i) at least first and second rectifier legs coupled from the Vo− node to the Vo+ node, each rectifier leg including a diode and a silicon controlled rectifier (SCR), wherein anodes of the diodes are coupled to the Vo− node, cathodes of the diodes are coupled to anodes of the SCRs at AC input nodes, and cathodes of the SCRs are coupled to the Vo+ node; and (ii) a bus capacitor coupled from the Vo+ node to the Vo− node, the soft start circuit operable to control respective firing angles of the SCRs such that: (i) the output voltage substantially linearly ramps from a low initial value to a relatively high final value, and (ii) charge up currents into the bus capacitor are controlled.

2. The soft start circuit of claim 1, further comprising:
an integrator circuit operable to produce timing waves corresponding to integrals of respective first half cycles of the one or more phases of the AC source, the timing waves resetting when the one or more phases of the AC source are concurrently negative;
a peak storage circuit operable to produce a peak voltage, VPK, corresponding to peaks of the timing waves;
a ramp circuit operable to produce a timing ramp signal capable of ramping from an initial value substantially equal to VPK to a final value lower than the initial value; and
a comparator circuit operable to produce pulsed output signals which initiate when the respective timing waves substantially equal a timing reference signal which is a function of the timing ramp signal, the pulsed output signals for controlling respective firing angles of the SCRs.

3. The soft start circuit of claim 2, wherein the timing reference signal is substantially parabolic such that the output voltage substantially linearly ramps from a low initial value to a relatively high final value.

4. The soft start circuit of claim 2, wherein the comparator circuit is operable to (i) measure voltages across the respective SCRs, (ii) prevent pulsed output signals when the voltages across the respective SCRs are instantaneously less than a threshold, and (iii) automatically terminate respective pulsed output signals when corresponding voltages across the SCRs fall below the threshold.

5. The soft start circuit of claim 4, wherein the threshold is about 15 to 30 volts.

6. The soft start circuit of claim 1, further comprising a watchdog circuit operable to reset respective timing waves when those waves do not reset within a defined period of time.

7. The soft start circuit of claim 6, wherein the watchdog circuit is operable to produce respective watchdog ramp signals initiating substantially with corresponding timing waves, the watchdog circuit resetting a timing wave when a corresponding watchdog ramp signal reaches a threshold.

8. The soft start circuit of claim 7, wherein the threshold is a function of a number of phases of the AC source.

9. The soft start circuit of claim 2, further comprising a clamp circuit operable to control the timing reference signal as a function of the output voltage when the output voltage falls below a threshold.

10. The soft start circuit of claim 9, further comprising a loss of AC source circuit operable to produce a AC source loss signal indicative of whether the AC source is producing voltage, the clamp circuit releasing the timing reference signal after the AC source loss signal indicates that the AC source is producing voltage.

11. The soft start circuit of claim 10, wherein the loss of line signal is derived from the OR of the timing waves.

12. The soft start circuit of claim 10, further comprising a voltage dip circuit including a monitoring circuit receiving information derived from the output voltage, the voltage dip circuit being operable to enable the clamp circuit when the monitoring circuit indicates that the output voltage has fallen below the threshold.

13. The soft start circuit of claim 12, wherein the clamp circuit, when enabled, controls the timing reference signal to be a function of the output voltage such that the timing reference signal causes the firing angles of the SCRs to be retarded when the AC source loss signal indicates that the AC source is producing voltage and the clamp circuit releases the timing reference signal.

14. The soft start circuit of claim 2, further comprising a timing reference voltage maximum clamp circuit operable to prevent the timing reference voltage from exceeding VPK when the output voltage Vo is in regulation.

15. The soft start circuit of claim 14, wherein the timing reference voltage maximum clamp circuit prevents the timing reference voltage from reaching a value which is slightly less than VPK when the output voltage Vo is in regulation.

16. The soft start circuit of claim 9, further comprising a loss of line circuit including a loss of line comparator receiving an OR of the timing waves as one input and a fraction of VPK as another input such that a series of pulses are produce when one phase of the AC source does not produce voltage.

17. The soft start circuit of claim 16, wherein the series of pulses occur at a frequency of two times the frequency of the AC source.

18. The soft start circuit of claim 16, wherein the loss of line circuit further includes a pulse monitoring circuit operable to determine when the series of pulses occurs, the pulse monitoring circuit enabling the clamp circuit after one or more pulses occur.

19. The soft start circuit of claim 10, wherein the pulse monitoring circuit enables the clamp circuit after two or more pulses occur.

20. The soft start circuit of claim 1, further comprising:
an output voltage regulation circuit including a error amplifier operable to receive an output voltage reference and a feedback signal representing the output voltage Vo, the error amplifier producing an error voltage having a magnitude proportional to the difference between the output voltage reference and the feedback signal;
a ramp circuit operable to produce a timing ramp signal capable of ramping from an initial value to a final value;
a control circuit operable to produce the timing reference signal, the timing reference signal having a magnitude which is a function of at least one of the error signal and the timing ramp signal;
a comparator circuit operable to produce pulsed output signals for controlling respective firing angles of the SCRs, the pulsed output signals being initiated as a function of the magnitude of the timing reference signal; and
an error voltage enabling circuit operable to (i) reduce the magnitude of the error voltage available to the control circuit when the error voltage is a predetermined polarity, and (ii) not change the magnitude of the error voltage available to the control circuit when the error voltage is of an opposite polarity.

21. The soft start circuit of claim 20, further comprising:
an integrator circuit operable to produce timing waves corresponding to integrals of respective first half cycles of the one or more phases of the AC source, the timing waves resetting when the one or more phases of the AC source are concurrently negative; and
a peak storage circuit operable to produce a peak voltage, VPK, representing peaks of the timing waves, wherein:

the timing reference signal is operable to ramp from a relatively high initial value of VPK to a substantially low final value; and the comparator circuit is operable to initiate the pulsed output signals when the respective timing waves are substantially equal to the timing reference signal.

22. The soft start circuit of claim 21, wherein control circuit is operable to produce the timing reference signal such that its magnitude substantially represents the sum of VPK and the error voltage minus the timing ramp signal.

23. The soft start circuit of claim 22, wherein:

the error amplifier produces the error voltage such that it has a first polarity when the magnitude of the output voltage reference is greater than the magnitude of the feedback signal and a second polarity when the magnitude of the output voltage reference is less than the magnitude of the feedback signal, and the error voltage enabling circuit (i) reduces the magnitude of the error voltage available to the control circuit when the error voltage is of the first polarity, and (ii) does not substantially change the magnitude of the error voltage available to the control circuit when the error voltage is of the second polarity.

24. The soft start circuit of claim 23, wherein the timing reference signal is substantially parabolic such that the output voltage substantially linearly ramps from a low initial value to a relatively high final value when the error voltage is of the first polarity.

25. The soft start circuit of claim 21, wherein the comparator circuit is operable to (i) receive measured voltages across the respective SCRs, (ii) prevent pulsed output signals when the voltages across the respective SCRs are instantaneously less than a threshold, and (iii) automatically terminate respective pulsed output signals when corresponding voltages across the SCRs fall below the threshold.

26. The soft start circuit of claim 25, wherein the threshold is about 15 to 30 volts.

27. The soft start circuit of claim 21, further comprising a watchdog circuit operable to reset respective timing waves when those waves do not reset within a defined period of time.

28. The soft start circuit of claim 27, wherein the watchdog circuit is operable to produce respective watchdog ramp signals initiating substantially with corresponding timing waves, the watchdog circuit resetting respective timing waves when a corresponding watchdog ramp signal reaches a threshold.

29. The soft start circuit of claim 28, wherein the threshold is a function of a number of phases of the AC source.

30. The soft start circuit of claim 21, further comprising a clamp circuit operable to control the timing reference signal as a function of the output voltage when the output voltage falls below a threshold.

31. The soft start circuit of claim 30, further comprising a loss of AC source circuit operable to produce a AC source loss signal indicative of whether the AC source is producing voltage, the clamp circuit releasing the timing reference signal after the AC source loss signal indicates that the AC source is producing voltage.

32. The soft start circuit of claim 31, wherein the loss of AC source signal is derived from the OR of the timing waves.

33. A rectifier circuit for converting power from an AC source having one or more phases to DC power having an output voltage (Vo) from a Vo+ node to a Vo− node, the rectifier circuit comprising:

first, second and third rectifier legs coupled from the Vo− node to the Vo+ node, each rectifier leg including a diode and a silicon controlled rectifier (SCR), wherein anodes of the diodes are coupled to the Vo− node, cathodes of the diodes are coupled to anodes of the SCRs at AC input nodes, and cathodes of the SCRs are coupled to the Vo+ node;

a bus capacitor coupled from the Vo+ node to the Vo− node; and a soft start circuit operable to control respective firing angles of the SCRs such that: (i) the output voltage substantially linearly ramps from a low initial value to a relatively high final value, and (ii) charge up currents into the bus capacitor are controlled.

34. The rectifier circuit of claim 33, wherein the soft start circuit further comprises:

an integrator circuit operable to produce timing waves corresponding to integrals of respective first half cycles of the one or more phases of the AC source, the timing waves resetting when the one or more phases of the AC source are concurrently negative;

a peak storage circuit operable to produce a peak voltage, VPK, corresponding to peaks of the timing waves;

a ramp circuit operable to produce a timing ramp signal capable of ramping from an initial value substantially equal to VPK to a final value lower than the initial value; and a comparator circuit operable to produce pulsed output signals which initiate when the respective timing waves substantially equal a timing reference signal which is a function of the timing ramp signal, the pulsed output signals for controlling respective firing angles of the SCRs.

35. The rectifier circuit of claim 34, wherein the timing reference signal is substantially parabolic such that the output voltage substantially linearly ramps from a low initial value to a relatively high final value.

36. The rectifier circuit of claim 34, wherein the comparator circuit is operable to (i) measure voltages across the respective SCRs, (ii) prevent pulsed output signals when the voltages across the respective SCRs are instantaneously less than a threshold, and (iii) automatically terminate respective pulsed output signals when corresponding voltages across the SCRs fall below the threshold.

37. The rectifier circuit of claim 36, wherein the threshold is about 15 to 30 volts.

38. The rectifier circuit of claim 33, wherein the soft start circuit further comprises a watchdog circuit operable to reset respective timing waves when those waves do not reset within a defined period of time.

39. The rectifier circuit of claim 38, wherein the watchdog circuit is operable to produce respective watchdog ramp signals initiating substantially with corresponding timing waves, the watchdog circuit resetting a timing wave when a corresponding watchdog ramp signal reaches a threshold.

40. The rectifier circuit of claim 39, wherein the threshold is a function of a number of phases of the AC source.

41. The rectifier circuit of claim 34, wherein the soft start circuit further comprises a clamp circuit operable to control the timing reference signal as a function of the output voltage when the output voltage falls below a threshold.

42. The rectifier circuit of claim 41, wherein the soft start circuit further comprises a loss of AC source circuit operable to produce a AC source loss signal indicative of whether the AC source is producing voltage, the clamp circuit releasing the timing reference signal after the AC source loss signal indicates that the AC source is producing voltage.

43. The rectifier circuit of claim 42, wherein the loss of AC source signal is derived from the OR of the timing waves.

44. The rectifier circuit of claim 42, further comprising a voltage dip circuit including a monitoring circuit receiving information derived from the output voltage, the voltage dip circuit being operable to enable the clamp circuit when the monitoring circuit indicates that the output voltage has fallen below the threshold.

45. The rectifier circuit of claim 44, wherein the clamp circuit, when enabled, controls the timing reference signal to be a function of the output voltage such that the timing reference signal causes the firing angles of the SCRs to be retarded when the AC source loss signal indicates that the AC source is producing voltage and the clamp circuit releases the timing reference signal.

46. The rectifier circuit of claim 34, further comprising a timing reference voltage maximum clamp circuit operable to prevent the timing reference voltage from exceeding VPK when the output voltage Vo is in regulation.

47. The rectifier circuit of claim 46, wherein the timing reference voltage maximum clamp circuit prevents the timing reference voltage from reaching a value which is slightly less than VPK when the output voltage Vo is in regulation.

48. The rectifier circuit of claim 41, further comprising a loss of line circuit including a loss of line comparator receiving an OR of the timing waves as one input and a fraction of VPK as another input such that a series of pulses are produce when one phase of the AC source does not produce voltage.

49. The rectifier circuit of claim 48, wherein the series of pulses occur at a frequency of two times the frequency of the AC source.

50. The rectifier circuit of claim 48, wherein the loss of line circuit further includes a pulse monitoring circuit operable to determine when the series of pulses occurs, the pulse monitoring circuit enabling the clamp circuit after one or more pulses occur.

51. The rectifier circuit of claim 50, wherein the pulse monitoring circuit enables the clamp circuit after two or more pulses occur.

52. The rectifier circuit of claim 33, wherein the soft start circuit further comprises:
an output voltage regulation circuit including a error amplifier operable to receive an output voltage reference and a feedback signal representing the output voltage Vo, the error amplifier producing an error voltage having a magnitude proportional to the difference between the output voltage reference and the feedback signal;
a ramp circuit operable to produce a timing ramp signal capable of ramping from an initial value to a final value;
a control circuit operable to produce the timing reference signal, the timing reference signal having a magnitude which is a function of at least one of the error signal and the timing ramp signal;
a comparator circuit operable to produce pulsed output signals for controlling respective firing angles of the SCRs, the pulsed output signals being initiated as a function of the magnitude of the timing reference signal; and
an error voltage enabling circuit operable to (i) reduce the magnitude of the error voltage available to the control circuit when the error voltage is a predetermined polarity, and (ii) not change the magnitude of the error voltage available to the control circuit when the error voltage is of an opposite polarity.

53. The rectifier circuit of claim 52, wherein the soft start circuit further comprises:

an integrator circuit operable to produce timing waves corresponding to integrals of respective first half cycles of the one or more phases of the AC source, the timing waves resetting when the one or more phases of the AC source are concurrently negative; and
a peak storage circuit operable to produce a peak voltage, VPK, representing peaks of the timing waves, wherein:
the timing reference signal is operable to ramp from a relatively high initial value of VPK to a substantially low final value; and
the comparator circuit is operable to initiate the pulsed output signals when the respective timing waves are substantially equal to the timing reference signal.

54. The rectifier circuit of claim 53, wherein control circuit is operable to produce the timing reference signal such that its magnitude substantially represents the sum of VPK and the error voltage minus the timing ramp signal.

55. The rectifier circuit of claim 54, wherein:
the error amplifier produces the error voltage such that it has a first polarity when the magnitude of the output voltage reference is greater than the magnitude of the feedback signal and a second polarity when the magnitude of the output voltage reference is less than the magnitude of the feedback signal, and
the error voltage enabling circuit (i) reduces the magnitude of the error voltage available to the control circuit when the error voltage is of the first polarity, and (ii) does not substantially change the magnitude of the error voltage available to the control circuit when the error voltage is of the second polarity.

56. The rectifier circuit of claim 55, wherein the timing reference signal is substantially parabolic such that the output voltage substantially linearly ramps from a low initial value to a relatively high final value when the error voltage is of the first polarity.

57. The rectifier circuit of claim 53, wherein the comparator circuit is operable to (i) measure voltages across the respective SCRs, (ii) prevent pulsed output signals when the voltages across the respective SCRs are instantaneously less than a threshold, and (iii) automatically terminate respective pulsed output signals when corresponding voltages across the SCRs fall below the threshold.

58. The rectifier circuit of claim 57, wherein the threshold is about 15 to 30 volts.

59. The rectifier circuit of claim 53, wherein the soft start circuit further comprises a watchdog circuit operable to reset respective timing waves when those waves do not reset within a defined period of time.

60. The rectifier circuit of claim 59, wherein the watchdog circuit is operable to produce respective watchdog ramp signals initiating substantially with corresponding timing waves, the watchdog circuit resetting respective timing waves when a corresponding watchdog ramp signal reaches a threshold.

61. The rectifier circuit of claim 60, wherein the threshold is a function of a number of phases of the AC source.

62. The rectifier circuit of claim 53, wherein the soft start circuit further comprises a clamp circuit operable to control the timing reference signal as a function of the output voltage when the output voltage falls below a threshold.

63. The rectifier circuit of claim 62, wherein the soft start circuit further comprises a loss of AC source circuit operable to produce a AC source loss signal indicative of whether the AC source is producing voltage, the clamp circuit releasing the timing reference signal after the AC source loss signal indicates that the AC source is producing voltage.

64. The rectifier circuit of claim 63, wherein the AC source loss signal corresponds to the OR of the timing waves.

65. A soft start circuit for controlling a rectifier circuit, the rectifier circuit for converting power from an AC source having one or more phases to DC power having an output voltage (Vo) from a Vo+ node to a Vo− node, the rectifier circuit including: (i) at least first and second rectifier legs coupled from the Vo− node to the Vo+ node, each rectifier leg including a diode and a latchable MOS gated switch, wherein anodes of the diodes are coupled to the Vo− node, cathodes of the diodes are coupled to one terminal of the latchable MOS gated switches at AC input nodes, and another terminal of the latchable MOS gated switches are coupled to the Vo+ node; and (ii) a bus capacitor coupled from the Vo+ node to the Vo− node, the soft start circuit operable to control respective firing angles of the latchable MOS gated switches such that: (i) the output voltage substantially linearly ramps from a low initial value to a relatively high final value, and (ii) charge up currents into the bus capacitor are controlled.

66. The soft start circuit of claim 65, further comprising:
an integrator circuit operable to produce timing waves corresponding to integrals of respective first half cycles of the one or more phases of the AC source, the timing waves resetting when the one or more phases of the AC source are concurrently negative;
a peak storage circuit operable to produce a peak voltage, VPK, corresponding to peaks of the timing waves;
a ramp circuit operable to produce a timing ramp signal capable of ramping from an initial value substantially equal to VPK to a final value lower than the initial value; and
a comparator circuit operable to produce pulsed output signals which initiate when the respective timing waves substantially equal a timing reference signal which is a function of the timing ramp signal, the pulsed output signals for controlling respective firing angles of the latchable MOS gated switches.

67. The soft start circuit of claim 66, wherein the timing reference signal is substantially parabolic such that the output voltage substantially linearly ramps from a low initial value to a relatively high final value.

68. The soft start circuit of claim 66, wherein the comparator circuit is operable to (i) measure voltages across the respective latchable MOS gated switches, (ii) prevent pulsed output signals when the voltages across the respective latchable MOS gated switches are instantaneously less than a threshold, and (iii) automatically terminate respective pulsed output signals when corresponding voltages across the latchable MOS gated switches fall below the threshold.

69. The soft start circuit of claim 68, wherein the threshold is about 15 to 30 volts.

70. The soft start circuit of claim 65, further comprising a watchdog circuit operable to reset respective timing waves when those waves do not reset within a defined period of time.

71. The soft start circuit of claim 70, wherein the watchdog circuit is operable to produce respective watchdog ramp signals initiating substantially with corresponding timing waves, the watchdog circuit resetting a timing wave when a corresponding watchdog ramp signal reaches a threshold.

72. The soft start circuit of claim 71, wherein the threshold is a function of a number of phases of the AC source.

73. The soft start circuit of claim 66, further comprising a clamp circuit operable to control the timing reference signal as a function of the output voltage when the output voltage falls below a threshold.

74. The soft start circuit of claim 73, further comprising a loss of AC source circuit operable to produce a AC source loss signal indicative of whether the AC source is producing voltage, the clamp circuit releasing the timing reference signal after the AC source loss signal indicates that the AC source is producing voltage.

75. The soft start circuit of claim 74, wherein the AC source loss signal is derived from the OR of the timing waves.

76. The soft start circuit of claim 74, further comprising a voltage dip circuit including a monitoring circuit receiving information derived from the output voltage, the voltage dip circuit being operable to enable the clamp circuit when the monitoring circuit indicates that the output voltage has fallen below the threshold.

77. The soft start circuit of claim 76, wherein the clamp circuit, when enabled, controls the timing reference signal to be a function of the output voltage such that the timing reference signal causes the firing angles of the SCRs to be retarded when the AC source loss signal indicates that the AC source is producing voltage and the clamp circuit releases the timing reference signal.

78. The soft start circuit of claim 66, further comprising a timing reference voltage maximum clamp circuit operable to prevent the timing reference voltage from exceeding VPK when the output voltage Vo is in regulation.

79. The soft start circuit of claim 78, wherein the timing reference voltage maximum clamp circuit prevents the timing reference voltage from reaching a value which is slightly less than VPK when the output voltage Vo is in regulation.

80. The soft start circuit of claim 73, further comprising a loss of line circuit including a loss of line comparator receiving an OR of the timing waves as one input and a fraction of VPK as another input such that a series of pulses are produce when one phase of the AC source does not produce voltage.

81. The soft start circuit of claim 80, wherein the series of pulses occur at a frequency of two times the frequency of the AC source.

82. The soft start circuit of claim 80, wherein the loss of line circuit further includes a pulse monitoring circuit operable to determine when the series of pulses occurs, the pulse monitoring circuit enabling the clamp circuit after one or more pulses occur.

83. The soft start circuit of claim 82, wherein the pulse monitoring circuit enables the clamp circuit after two or more pulses occur.

84. The soft start circuit of claim 65, further comprising:
an output voltage regulation circuit including a error amplifier operable to receive an output voltage reference and a feedback signal representing the output voltage Vo, the error amplifier producing an error voltage having a magnitude proportional to the difference between the output voltage reference and the feedback signal;
a ramp circuit operable to produce a timing ramp signal capable of ramping from an initial value to a final value;
a control circuit operable to produce a timing reference signal, the timing reference signal having a magnitude which is a function of at least one of the error signal and the timing ramp signal;
a comparator circuit operable to produce pulsed output signals for controlling respective firing angles of the latchable MOS gated switches, the pulsed output signals being initiated as a function of the magnitude of the timing reference signal; and an error voltage enabling circuit operable to (i) reduce the magnitude of the error voltage available to the control circuit when the error voltage is a predetermined polarity, and (ii) not change the magnitude of the error voltage available to the control circuit when the error voltage is of an opposite polarity.

85. The soft start circuit of claim 84, further comprising:

an integrator circuit operable to produce timing waves corresponding to integrals of respective first half cycles of the one or more phases of the AC source, the timing waves resetting the one or more phases of the AC source are concurrently negative; and a peak storage circuit operable to produce a peak voltage, VPK, representing peaks of the timing waves, wherein:

the timing reference signal is operable to ramp from a relatively high initial value of VPK to a substantially low final value; and the comparator circuit is operable to initiate the pulsed output signals when the respective timing waves are substantially equal to the timing reference signal.

86. The soft start circuit of claim 85, wherein control circuit is operable to produce the timing reference signal such that its magnitude substantially represents the sum of VPK and the error voltage minus the timing ramp signal.

87. The soft start circuit of claim 86, wherein:

the error amplifier produces the error voltage such that it has a first polarity when the magnitude of the output voltage reference is greater than the magnitude of the feedback signal and a second polarity when the magnitude of the output voltage reference is less than the magnitude of the feedback signal, and the error voltage enabling circuit (i) reduces the magnitude of the error voltage available to the control circuit when the error voltage is of the first polarity, and (ii) does not substantially change the magnitude of the error voltage available to the control circuit when the error voltage is of the second polarity.

88. The soft start circuit of claim 87, wherein the timing reference signal is substantially parabolic such that the output voltage substantially linearly ramps from a low initial value to a relatively high final value when the error voltage is of the first polarity.

89. The soft start circuit of claim 85, wherein the comparator circuit is operable to (i) receive measured voltages across the respective SCRs, (ii) prevent pulsed output signals when the voltages across the respective SCRs are instantaneously less than a threshold, and (iii) automatically terminate respective pulsed output signals when corresponding voltages across the SCRs fall below the threshold.

90. The soft start circuit of claim 89, wherein the threshold is about 15 to 30 volts.

91. The soft start circuit of claim 85, further comprising a watchdog circuit operable to reset respective timing waves when those waves do not reset within a defined period of time.

92. The soft start circuit of claim 91, wherein the watchdog circuit is operable to produce respective watchdog ramp signals initiating substantially with corresponding timing waves, the watchdog circuit resetting respective timing waves when a corresponding watchdog ramp signal reaches a threshold.

93. The soft start circuit of claim 92, wherein the threshold is a function of a number of phases of the AC source.

94. The soft start circuit of claim 85, further comprising a clamp circuit operable to control the timing reference signal as a function of the output voltage when the output voltage falls below a threshold.

95. The soft start circuit of claim 94, further comprising a loss of AC source circuit operable to produce a AC source loss signal indicative of whether the AC source is producing voltage, the clamp circuit releasing the timing reference signal after the AC source loss signal indicates that the AC source is producing voltage.

96. The soft start circuit of claim 95, wherein the AC source loss signal is derived from the OR of the timing waves.

97. The soft start circuit of claim 1, further comprising at least one inductor coupled from at least one of the Vo+ node and the Vo− node to one terminal of the bus capacitor, the output voltage Vo being taken across the bus capacitor.

98. The soft start circuit of claim 97, wherein one inductor is coupled from the Vo+ node to one terminal of the bus capacitor and another inductor is coupled from the Vo− node to another terminal of the bus capacitor, the output voltage Vo being taken across the bus capacitor.

* * * * *